(12) United States Patent
Asahi et al.

(10) Patent No.: US 8,389,049 B2
(45) Date of Patent: Mar. 5, 2013

(54) OPTICAL FILM, METHOD FOR PRODUCING THE SAME, POLARIZING PLATE AND IMAGE DISPLAY DEVICE

(75) Inventors: Miho Asahi, Minami-Ashigara (JP);
Kenichi Fukuda, Minami-Ashigara (JP);
Katsumi Inoue, Minami-Ashigara (JP);
Jun Watanabe, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 868 days.

(21) Appl. No.: 12/370,645

(22) Filed: Feb. 13, 2009

(65) Prior Publication Data

US 2009/0202819 A1     Aug. 13, 2009

(30) Foreign Application Priority Data

Feb. 13, 2008    (JP) ................ P2008-032288
Feb. 12, 2009    (JP) ................ P2009-029706

(51) Int. Cl.
*B05D 5/06*        (2006.01)

(52) U.S. Cl. ........................ 427/164; 427/162

(58) Field of Classification Search ................. None
See application file for complete search history.

(56) References Cited

U.S. PATENT DOCUMENTS 6,489,015 B1 *   12/2002   Tsuchiya et al. ............ 428/212
6,852,376 B2 *   2/2005   Chien et al. .................. 428/1.3

FOREIGN PATENT DOCUMENTS

JP    2006-235198 A    9/2006
JP    2007-238897 A    9/2007
JP      2007238897 A   *   9/2007

OTHER PUBLICATIONS

Robert C. Weast, editor, "CRC Handbook of Chemistry and Physics", 1977, CRC Press, Inc., 58th edition, pp. B-155, B-171, B-172.*

* cited by examiner

*Primary Examiner* — David Turocy
*Assistant Examiner* — Michael G Miller
(74) *Attorney, Agent, or Firm* — Birch, Stewart, Kolasch & Birch, LLP.

(57) ABSTRACT

An optical film, includes: a transparent support; and an optical functional layer as the outermost layer of the optical film, the optical functional layer being provided on or above the transparent support, wherein the optical functional layer has a thickness of 50 nm or more and not more than 250 nm; the optical functional layer contains low refractive index fine particles having a refractive index of not more than 1.45, high refractive index fine particles having a refractive index of 1.55 or more, and a fluorine-containing compound; the low refractive index fine particles are arranged substantially in a line on a surface of the optical functional layer on the opposite side of the transparent support; and the high refractive index fine particles are unevenly distributed in a lower part of the optical functional layer on the side of the transparent support.

5 Claims, 2 Drawing Sheets

OPTICAL FILM, METHOD FOR PRODUCING THE SAME, POLARIZING PLATE AND IMAGE DISPLAY DEVICE

BACKGROUND OF THE INVENTION

1. Field of the Invention

The present invention relates to an optical film, a method for producing the same, a polarizing plate and an image display device.

2. Description of the Related Art

In various image display devices, for example, a liquid crystal display device (LCD), a plasma display panel (PDP), an organic EL display (OLED), a cathode ray tube display device (CRT), etc., an antireflection film is disposed on the surface of the display for the purpose of preventing reflection of external light or a lowering of contrast due to reflection of an image. For that reason, the antireflection film is required to have high physical strengths (for example scratch resistance, etc.), transmittance, chemical resistance, weather resistance and the like in addition to high antireflection properties.

In particular, an antireflection film with high antireflection properties is desired for the purposes of preventing the reflection of external light and enhancing the image quality in an image display device. There has hitherto been employed a method of providing an optical functional layer (optical interference layer) on a hard coat layer foamed on a plastic substrate. In order to realize higher antireflection properties, it is known to be effective to stack plural optical functional layers. However, in order to realize this by a wet coating process, it is necessary to repeat steps of coating, drying and curing several times; and thus, not only the productivity is remarkably lowered, but the coating cost increases. For example, when two layers of a low refractive index layer and a high refractive index layer are stacked as the optical functional layer, repetition of two times is necessary. In the case of additionally coating a middle refractive index layer for the purpose of further reducing the reflectance, repetition of three times is necessary. Accordingly, a technology for forming plural layers by single coating is eagerly desired.

In order to prevent the reflection of external light, a method of reducing the reflectance by providing a layer having a low refractive index as far as possible is also effective. As a method of reducing the refractive index of a layer, there is known a method of introducing a fluorine atom or introducing an inorganic fine particle having a hollow structure in the inside thereof. However, according to all of these methods, there is a tendency in which the coating strength and adhesion are impaired and the scratch resistance is lowered. Thus, it was difficult to make both low refractive index and high scratch resistance compatible with each other.

As a method for solving this problem, JP-A-2006-235198 proposes an optical film including a support having thereon an optical functional layer prepared by coating a composition containing a fine particle and a binder, wherein an SP value which is a ratio of an average particle packing factor (B) in the 30% thickness on the upper layer side on the opposite side to the support to an average particle packing factor (A) in the whole layer of the optical functional layer [(B/A)×100] is 90% or more and not more than 333%.

Also, JP-A-2007-238897 discloses a curable resin composition containing (A) a metal oxide particle having (Ab) a polymerizable unsaturated group-containing organic compound bound thereto; (B) an ethylenically unsaturated group-containing fluorine-containing polymer; (C) a particle composed of; as a major component silica having (Cb) an alkoxysilyl group-containing fluorine-containing polymer bound thereto; (D1) a solvent having high solubility against the ethylenically unsaturated group-containing fluorine-containing polymer (B); and (D2) a solvent having a lower relative evaporation rate than the solvent (D1) and having compatibility with the solvent (D1). According to the technology of JP-A-2007-238897, it is mentioned that two or more layers can be formed from a single coating film obtained by coating the subject curable resin composition.

However, the cured film obtained according to the technology of JP-A-2007-238897 involves a problem that the scratch resistance is still insufficient.

SUMMARY OF THE INVENTION

It is important that an antireflection film also serves as a protective film because it is disposed on the outermost surface of an image display device; and the antireflection film is required to have, high physical strengths. In order to realize these matters, it is important that a low refractive index fine particle exists in a high density on the outermost surface. Similarly, in the development, it is required that regulation with a high degree of freedom can be achieved such that the refractive index and the thickness of the high refractive index layer can be arbitrarily changed. If it would be possible to make all of the high refractive index fine particles maldistributed on the side of the support such regulation will become easy, and it will be able to be expected that the degree of freedom regarding the kind of the high refractive index fine particle or the regulation of the coating composition is increased.

Furthermore, the development of an optical film capable of forming an optical functional layer in which the low refractive index fine particle is disposed on the outermost surface by coating in a small number of times as far as possible, for example, one time, and a method for producing the same are eagerly desired.

An object of the invention is to provide an optical film which is high in antireflection properties, excellent in scratch resistance and suitable for mass production and a method for producing the same. Another object of the invention is to provide a polarizing plate and an image display device, each of which is provided with the subject optical film.

As a result of extensive and intensive investigations, the present inventors have found that the foregoing problems can be attained by the following measures.

(1) An optical film, comprising:
a transparent support; and
an optical functional layer as the outermost layer of the optical film, the optical functional layer being provided on or above the transparent support,
wherein the optical functional layer has a thickness of 50 nm or more and not more than 250 nm;
the optical functional layer contains low refractive index fine particles having a refractive index of not more than 1.45, high refractive index fine particles having a refractive index of 1.55 or more, and a fluorine-containing compound;
the low refractive index fine particles are arranged substantially in a line on a surface of the optical functional layer on the opposite side of the transparent support; and
the high refractive index fine particles are unevenly distributed in a lower part of the optical functional layer on the side of the transparent support.

(2) The optical film as described in (1) above,
wherein the optical functional layer contains the low refractive index fine particles in a range of from 5% by mass to 15% by mass with respect to the entire solid content of the optical functional layer.

(3) The optical film as described in (1) or (2) above, wherein the optical functional layer contains the high refractive index fine particles in a range of from 30% by mass to 50% by mass with respect to the entire solid content of the optical functional layer.

(4) The optical film as described in any of (1) to (3) above, wherein the low refractive index fine particles are silica fine particles or hollow silica fine particles.

(5) The optical film as described in any of (1) to (4) above, wherein a ratio of $[(P_{Lu}/P_{Lt}) \times 100]$ is 200% or more, in which $P_{Lt}$ represents an average particle packing factor of the low refractive index fine particles in the whole layer of the optical functional layer; and $P_{Lu}$ represents an average particle packing factor of the low refractive index fine particles in the 30% thickness in an upper part of the optical functional layer on the opposite side of the transparent support.

(6) The optical film as described in any of (1) to (5) above, wherein a ratio of $[(P_{Hd}/P_{Ht}) \times 100]$ is 120% or more, in which $P_{Ht}$ represents an average particle packing factor of the high refractive index fine particles in the whole layer of the optical functional layer; and $P_{Hd}$ represents an average particle packing factor of the high refractive index fine particles in the 50% thickness in a lower part of the optical functional layer on the side of the transparent support.

(7) The optical Elm as described in any of (1) to (6) above, wherein the low refractive index fine particles are surface-modified with a fluorine atom-free silane coupling agent.

(8) The optical film as described in any of (1) to (7) above, wherein the high refractive index fine particles are oxide fine particles of at least one element selected from the group consisting of aluminum, zirconium, titanium, zinc, germanium, indium, tin, antimony and cerium.

(9) A polarizing plate, comprising:
the optical film as described in any of (1) to (8) above as a protective film for the polarizing plate.

(10) An image display device, comprising:
the optical film as described in any of (1) to (8) above or the polarizing plate as described in (9) above.

(11) A method for producing an optical film that includes a transparent support and an optical functional layer as the outermost layer of the optical film, the method comprising:
applying a curable composition directly or indirectly on the transparent support, the curable composition containing low refractive index fine particles having a refractive index of not more than 1.45, high refractive index fine particles having a refractive index of 1.55 or more, and a fluorine-containing compound; and
curing the curable composition to form an optical functional layer having a thickness of 50 nm or more and not more than 250 nm,
wherein in the optical functional layer, the low refractive index fine particles are arranged substantially in a line on a surface of the optical functional layer on the opposite side of the transparent support; and
the high refractive index fine particles are unevenly distributed in a lower part of the optical functional layer on the side of the transparent support.

(12) A method for producing an optical film that includes a transparent support and an optical functional layer as the outermost layer of the optical film, the method comprising:
applying curable compositions 1 and 2 directly or indirectly on the transparent support by using a coating device that includes at least one member selected from the group consisting of adjacent two slot dies and a slide-type coating head while supporting the transparent support by backup rollers and traveling the transparent support,
the curable composition 1 containing low refractive index fine particles having a refractive index of not more than 1.45 and a fluorine-containing compound.
the curable composition 2 containing high refractive index fine particles having a refractive index of 1.55 or more; and
curing the curable compositions 1 and 2 to form an optical functional layer having a thickness of 50 nm or more and not more than 250 nm,
wherein in the optical functional layer, the low refractive index fine particles are arranged substantially in a line on a surface of the optical functional layer on the opposite side of the transparent support; and
the high refractive index fine particles are unevenly distributed in a lower part of the optical functional layer on the side of the transparent support.

(13) The method as described in (11) or (12) above, wherein the low refractive index fine particles are silica fine particles or hollow silica fine particles.

(14) The method as described in any of (11) to (13) above, wherein the low refractive index fine particles are surface-modified with a fluorine atom-free silane coupling agent.

DETAILED DESCRIPTION OF THE INVENTION

Figure 1:
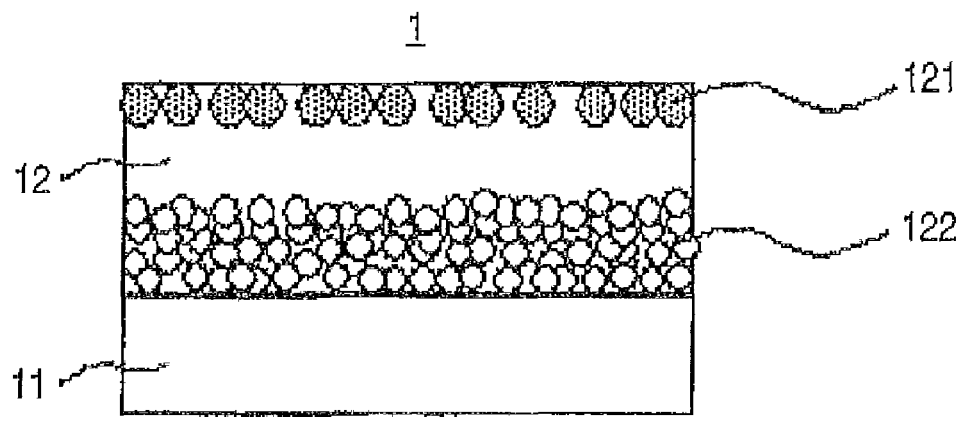
FIG. 1 is a cross-sectional view of an exemplary embodiment of an optical film of the invention.

The invention is hereunder described. In this specification, the term "(meth)acrylate" refers to "at least one of acrylate and methacrylate". The term "(meth)acrylic acid" or the like is also the same. Furthermore, the terms "bon the support" as referred to in the invention include both the case of "directly on the surface of the support" and the case of "on the surface via any layer (film) on the support".

The invention is concerned with an optical film in which an optical functional layer formed in the most surficial layer on a transparent support contains (A) a low refractive index fine particle having a refractive index of not more than 1.45, (B) a high refractive index fine particle having a reflective index of 1.55 or more and (C) a fluorine-containing compound; the low refractive index fine particle (A) is arranged substantially in a line on the surface of the optical functional layer on the opposite side of the transparent support; and the high refractive index fine particle (B) is maldistributed (unevenly distributed) in a lower part of the optical functional layer on the side of the transparent support. When the optical functional layer takes the foregoing structure, an antireflection layer configured of two layers of a low refractive index layer and a high refractive index layer is seemingly formed, and when the low refractive index fine particle is arranged in a line on the surface, the resulting optical film is excellent in scratch resistance. Furthermore, according to the invention, since the optical functional layer having the foregoing structure is formed by single coating, the invention is excellent in productivity.

In this specification, a layer having physical and optical functions, which is formed on the transparent support, is also referred to as "functional layer". In the optical film of the invention, the optical functional layer may serve as plural functional layers. Also, the optical film of the invention can have other functional layer as the need arises.

In the optical film of the invention, in the optical functional layer formed as the most surficial layer on the transparent support, the low refractive index fine particle is arranged substantially in a line on the outermost surface of the optical functional layer. The terms "arranged substantially in a line on the outermost surface of the optical functional layer" as referred to herein refer to the state in which when a cross section of the film is observed, a half or more of the low refractive index fine particle is arranged substantially in parallel on the outermost surface of the optical functional layer. This also includes those existing on the outermost surface of the optical functional layer, those covered by a binder and those in which a part of the particle is slightly projected from the surface. Also, there may be the case where the fine particle exists in the second line on the outermost surface. The case where a proportion of the fine particle existing in the first line is higher than that of those existing in the second line is considered to be included in the aspect that the fine particle is arranged substantially in a line in the invention.

The outermost surface of the optical functional layer refers to a region of from the farthest side from the support of the optical functional layer to a depth of two times the average particle size of the low refractive index fine particle. Also, in the optical functional layer, a region where the high refractive index fine particle is distributed is called the high refractive index layer; and even when the low refractive index fine particle is mixed in the region where the high refractive index fine particle is distributed, such a region is also called the high refractive index layer. A re-ion other this region is called the low refractive index layer. The case where the high refractive index fine particle is not maldistributed but distributed over the whole of the optical functional layer is defined such that the high refractive index layer is absent.

The invention is further described with reference to FIG. 1.

FIG. 1 is a cross-sectional diagrammatic view of an embodiment of the optical film of the invention.

An optical film 1 of the invention has an optical functional layer 12 on the outermost surf-Lace on a transparent support 1, and it is preferable that a high refractive index fine particle 122 is maldistributed on the side of the optical functional layer 12 coming into contact with the transparent support 11, whereas a low refractive index fine particle 121 is densely spread over the surface of the optical functional layer 12 on the opposite side to the surface coming into contact with the transparent support 11. An arbitrary functional layer may be provided between the optical functional layer 12 and the transparent support 11.

Figure 2:
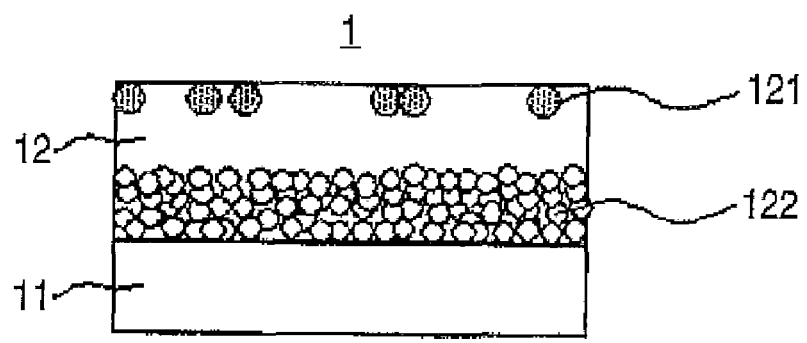
FIG. 2 is a cross-sectional view of another exemplary embodiment of an optical film of the invention.
Figure 3:
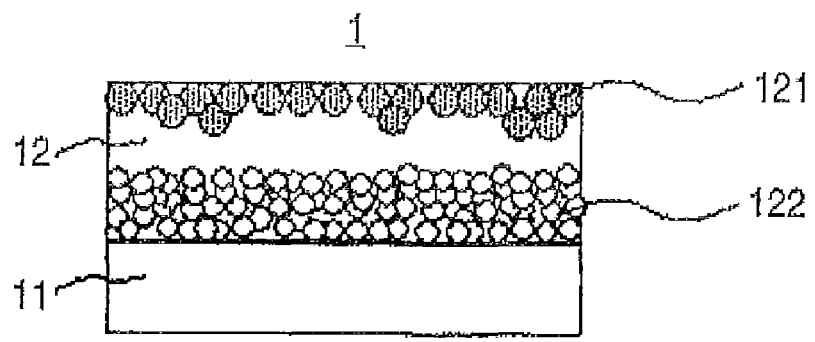
FIG. 3 is a cross-sectional view of another exemplary embodiment of an optical film of the invention.

FIGS. 2 and 3 are each a cross-sectional view of another embodiment of the optical film of the invention. As shown in FIG. 2, it is not necessary that the entire surface of the optical functional layer 12 is configured of the low refractive index fine particle 121. Also, as shown in FIG. 3, the low refractive index fine particle 121 may be superimposed in plural while densely spreading the low refractive index fine particle 121.

Raw materials constituting the optical functional layer are hereunder described in more detail.

In order to form the optical functional layer of the optical film of the invention, which has a specified structure, a fluorine-containing compound, a low refractive index fine particle and a high refractive index fine particle are an essential component. The fluorine-containing compound is hardly miscible with others and has properties that compounds having the same structure are liable to gather each other. Accordingly, it may be considered that when these essential components are mixed and coated, the fluorine-containing compound works to cause cohesion and to remove the low refractive index fine particle and the high refractive index fine particle. As a result, these fine particles are maldistributed on the uppermost surface side or the support side. At that time, for the purpose of taking a more thermally stable structure, a fine particle with relatively low surface energy is displaced onto the uppermost surface side, whereas a fine particle with relatively high surface energy is displaced onto the support side. The low refractive index fine particle has lower surface energy than the high refractive index fine particle, and the low refractive index fine particle is added in an amount at which it can exist on the uppermost surface. As a result, it may be considered that it has become possible to form the optical functional layer structure of the invention.

<(C) Fluorine-Containing Compound>

The optical film of the invention contains (C) a fluorine-containing compound. The fluorine-containing compound (C) is preferably formed of a thermally curable or photocurable fluorine-containing compound (C1). The thermally curable or photocurable fluorine-containing compound (C1) is preferably a fluorine-containing compound having a silicone structure in a molecule thereof, or containing a silicone compound in which a coating composition for forming an optical functional layer contains a crosslinking group, and having the same crosslinking group as the subject crosslinking group.

Also, surface free energy of (C) the fluorine-containing compound is preferably in die range of not more than 35 in N/m, and more preferably in the range of not more than 30 mN/m. By making the surface free energy of (C) the fluorine-containing compound fall within the foregoing range, cohesion between (C) the fluorine-containing compounds increases so that the layer separation can effectively occur. On the other hand, when the surface free energy after curing is too high, the layer separation hardly occurs, thereby possibly causing an increase of the reflectance, unevenness, etc. The surface free energy is preferably controlled to not higher than the foregoing preferred upper limit from the viewpoints of strength and coating properties.

The layer separation as referred to in the invention refers to the state in which the low refractive index fine particle is arranged substantially in a line on the surface of the optical functional layer, the high refractive index fine particle is maldistributed in a lower part of the optical functional layer, and the both fine particles are substantially separated from each other.

As to the examples of the thermally curable or photocurable fluorine-containing compound (C1) include a fluorine-containing monomer, oligomer or polymer and a fluorine-containing sol-gel raw material, each having a crosslinking or polymerizable functional group. It is preferable that such a compound is crosslinked with heat or ionizing radiations. A raw material having such properties that the surface of the optical functional layer formed therefrom has a coefficient of dynamic friction of from 0.03 to 0.30 and a contact angle against water of from 85 to 120° is preferable.

[Fluorine-Containing Polymer]

The above fluorine-containing polymer which is suitable for the fluorine-containing compound having a crosslinking or polymerizable functional group is a fluorine-containing polymer which is crosslinked with heat or ionizing radiations, and such a fluorine-containing polymer is preferable from the standpoint of enhancing the productivity in the case of coating and curing while web delivering a roll film or other cases. The fluorine-containing polymer is more preferably a fluorine-containing polymer which is crosslinked with ionizing radiations from the standpoint of productivity; and especially preferably a fluorine-containing polymer having plural ethylenically unsaturated groups as a crosslinking group in a molecule thereof from the standpoints of productivity and scratch resistance.

Examples of the fluorine-containing polymer include copolymers of a fluorine-containing monomer and a monomer having a crosslinking or polymerizable functional group. Examples of the fluorine-containing monomer include fluoroolefins (for example, fluoroethylene, vinylidene fluoride, tetrafluoroethylene, hexafluoroethylene, hexafluoropropylene, perfluoro-2,2-dimethyl-1,3-dioxole, etc.); partially or completely fluorinated alkyl ester derivatives of (meth) acrylic acid (for example, BISCOAT 6FM (manufactured by Osaka Organic Chemical Industry Ltd.), M-2020 (manufactured by Daikin Industries, Ltd.), etc.); and completely or partially fluorinated vinyl ethers.

In all embodiment, examples of the monomer for imparting a crosslinking group include (meth)acrylate monomers having a crosslinking functional group in advance in a molecule thereof, such as glycidyl methacrylate. In another embodiment, there is a method of using a monomer in which a fluorine-containing copolymer is synthesized using a monomer having a functional group such as a hydroxyl group, and such a substituent is then further modified to introduce a crosslinking or polymerizable functional group. Examples of such a monomer include (meth)acrylate monomers having a carboxyl group, a hydroxyl group, an amino group, a sulfonic acid group, etc. (for example, (meth)acrylic acid, methylol (meth)acrylate, hydroxyalkyl (meth)acrylates, allyl acrylate, etc.). The latter embodiment is disclosed in JP-A-10-25388 and JP-A-10-147739.

A fluorine-containing compound having crosslinking properties can also be used. A compound having a fluoroalkyl group is preferable as the fluorine-containing compound. The fluoroalkyl group has preferably from 1 to 20 carbon atoms, and more preferably from 1 to 10 carbon atoms. The fluoroalkyl group may have a linear structure (for example, $-CF_2CF_3$, $-CH_2(CF_2)_4H$, $-CH_2(CF_2)_8CF_3$, $-CH_2CH_2(CF_2)_4H$, etc.), a branched structure (for example, $CH(CF_3)_2$, $CH_2CF(CF_3)_2$, $CH(CH_3)CF_2CF_3$, $CH(CH_3)(CF_2)_5CF_2H$, etc.) or an alicyclic structure (preferably a 5-membered ring or a 6-membered ring; for example, a perfluorocyclohexyl group, a perfluorocyclopentyl group, an alkyl group substituted with such a group, etc.), or may have an ether bond (for example, $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$, etc.). A plural number of the fluoroalkyl group may be contained in the same molecule.

Examples of the crosslinking group include an acryloyl group, a methacryloyl group, a vinyl group, an allyl group, a cinnamoyl group, an epoxy group, an oxetanyl group, a hydroxyl group, a polyoxyalkylene group, a carboxyl group and an amino group. The fluorine based compound may be a copolymer with a fluorine atom-free compound or an oligomer. Its molecular weight is not particularly limited. Though the content of a fluorine atom of the fluorine-containing compound is not particularly limited, it is preferably 20% by mass or more, especially preferably from 30 to 70% by mass, and most preferably from 40 to 70% by mass. (In this specification, mass ratio is equal to weight ratio.) Preferred examples of such a fluorine-containing compound having a crosslinking group include R-2020, M-2020, R-3833 and M-3833 (all of which are a trade name, manufactured by Daikin Industries, Ltd.); and MEGAFAC F-171, MEGAFAC F-172, MEGAFAC F-179A and DEFENSA MCF-300 (all of which are a trade name, manufactured by DIC Corporation). However, it should not be construed that the invention is limited thereto.

The foregoing fluorine-containing polymer can properly contain a copolymerizable component from the viewpoints of solubility, dispersibility, coating properties, antifouling properties, antistatic properties and the like. In particular, in order to impart antifouling properties and slipperiness, it is preferred to introduce a silicone structure, and the silicone can be introduced into any of a principal chain and a side chain.

Examples of a method of introducing a silicone structure into a principal chain include a method of using a polymer type initiator such as an azo group-containing polysiloxane amide described in JP-A-6-93100 (examples of commercially available materials include VPS-0501 and VPS-1001 (trade names; manufactured by Wako Pure Chemical Industries, Ltd.)).

Also, as to a method of introducing a polysiloxane partial structure into a side chain, the synthesis can be achieved by a method of introducing a polysiloxane having a reactive group in one terminal end thereof (for example, SILAPRENE Series (manufactured by Chisso Corporation), etc.) through a polymer reaction, or a method of polymerizing a polysiloxane-containing silicon macromer described in *J. Appl. Polym. Sci.*, 2000, 78, 1955, JP-A-56-28219, etc. The both methods can be preferably adopted.

The fluorine-containing polymer may be properly used in combination with a curing agent having a polymerizable unsaturated group described in JP-A-2000-17028. It is also preferable to use the foregoing polymer in combination with a fluorine-containing polyfunctional compound having a polymerizable unsaturated group described in JP-A-2002-145952. Examples of the polyfunctional compound having a polymerizable unsaturated group include monomers having two or more of the foregoing ethylenically unsaturated groups. A hydrolysis condensate of an organosilane described in JP-A-2004-170901 is also preferable, and a hydrolysis condensate of a (meth)acryloyl group-containing organosilane is especially preferable.

In particular, in the case of using a compound having a polymerizable unsaturated group in a fluorine-containing polymer main body, such a compound is preferable because an effect to be brought by the combined use against the improvement of scratch resistance is large.

In the case where a fluorine-containing polymer itself does not have sufficient curing properties alone, necessary curing properties can be imparted by blending a crosslinking compound. For example, in the case where a fluorine-containing polymer main body contains a hydroxyl group, it is preferred to use various amino compounds as a curing agent. Examples of the amino compound which is used as the crosslinking compound include compounds having two or more in total of either one or both of a hydroxyalkylamino group and an alkoxyalkylamino group. Specific examples thereof include melamine based compounds urea based compounds, benzoguanamine based compounds and glycoluril based compounds. It is preferred to use an organic acid or a salt thereof for curing such a compound.

Specific examples of such a fluorine-containing polymer are described in JP-A-2003-222702, JP-A-2003-183322, etc.

{Hydrolysis Condensate of Fluorine-Containing Organosilane Material}

A hydrolysis condensate of a fluorine-containing organosilane compound can also be preferably used as the fluorine-containing compound having a crosslinking group from the standpoint that it is low in refractive index and high in hardness of a coating film surface. A condensate of a compound containing a hydrolyzable silanol at one terminal end or both terminal ends relative to a fluorinated alkyl group and a tetraalkoxysilane is preferable. Specific compositions are described in JP-A-2002-265866 and JP-A-2002-317152.

As described above, it is preferable that a fluorine-containing compound which is suitable as the fluorine-containing compound having a crosslinking group has a silicone structure in a molecule thereof. A silicone compound having the same crosslinking group as in the fluorine-containing compound may be contained in die coating composition.

Examples of the silicone compound include the following compounds.

Examples of the silicone compound having a crosslinking group include compounds containing plural dimethylsilyloxy units as a repeating unit and containing a substituent in a terminal end and/or a side chain of the chemical chain thereof. A structural unit other than dimethylsilyloxy may be contained in the chemical chain containing dimethylsilyloxy as a repeating unit. The substituent may be the same or different, and it is preferable that plural substituents are contained. Preferred examples of the substituent include groups containing, for example, an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group, an amino group, etc. Though the molecular weight is not particularly limited, it is preferably not more than 100,000, more preferably not more than 50,000, especially preferably from 3,000 to 30,000, and most preferably from 10,000 to 20,000. Tough the content of a silicon atom of the silicone compound is not particularly limited, it is preferably 18.0% by mass or more, especially preferably from 25.0 to 37.8% by mass, and most preferably from 30.0 to 37.0% by mass. Preferred examples of the silicone compound include X-22-174DX, X-22-2426, X-22-164B, X22-164C, X-22-170DX, X-22-176D and X-22-1821 (all of which are a trade name, manufactured by Shin-Etsu Chemical Co., Ltd.); FM-0725, FM-7725, FM-4421, FM-5521, FM-6621 and FM-1121 (all of which are manufactured by Chisso Corporation); and DMS-U22, RMS-033, RMS-083, UMS-182, DMS-H21, DMS-H31, HMS-301, FMS121, FMS123, FMS131, FMS141 and FMS221 (all of which are a trade name, manufactured by Gelest, Inc.). However, it should not be construed that the invention is limited thereto.

The addition amount of the silicone compound is preferably in the range of from 0.01 to 20% by mass, more preferably in the range of from 0.05 to 10% by mass, and especially preferably in the range of from 0.1 to 7% by mass relative to the fluorine-containing compound.

<Curable Compound>

In the coating composition for forming the optical functional layer of the optical film of the invention, a curable compound which is curable with the fluorine-containing compound having a crosslinking group may be contained. As a preferred example of the curable compound, monomers or oligomers having a reactive group which is crosslinked with heat or ionizing radiations are preferable; resin components having a polyfunctional monomer or a polyfunctional oligomer each having two or more functional groups are more preferable; and resin components having a polyfunctional monomer or a polyfunctional oligomer each having three or more functional groups are further preferable. Such a polyfunctional monomer or oligomer is also preferably incorporated in the functional layer. Also, two or more kinds of the polyfunctional monomer may be used in combination.

It is preferable that the curable compound has larger surface free energy than the fluorine-containing compound. A resin capable of forming a cured layer having surface free energy of 35 mN/m or more is preferable. The surface free energy is more preferably in the range of from 35 to 80 mN/m, and especially preferably in the range of from 40 to 60 mN/m.

By making the surface free energy fall with the foregoing range, it is easy to achieve the layer separation. Even when the surface free energy after curing is excessively high or excessively low, a lowering of reflectance, unevenness, etc. may be possibly generated. The surface free energy is preferably controlled to the foregoing preferred lower limit or higher from the viewpoints of strength and coating properties.

As the functional group of the ionizing radiation curable polyfunctional monomer or polyfunctional oligomer, photo, electron beam or ionizing radiation polymerizable functional groups axe preferable. Above all, photopolymerizable functional groups are preferable.

Specific examples of the photopolymerizable functional group include unsaturated polymerizable functional groups such as a (meth)acryloyl group, a vinyl group, a styryl group, and an allyl group, with a (meth)acryloyl group being preferable.

Specific examples of the photopolymerizable polyfunctional monomer having a photopolymerizable functional group include:

(meth)acrylic diesters of an alkylene glycol such as neopentyl glycol acrylate, 1,6-hexanediol (meth)acrylate and propylene glycol di(meth)acrylate;

(meth)acrylic diesters of a polyoxyalkylene glycol such as triethylene glycol di(meth)acrylate, dipropylene glycol di(meth)acrylate, polyethylene glycol di(meth)acrylate and polypropylene glycol di(meth)acrylate;

(meth)acrylic diesters of a polyhydric alcohol such as pentaerythritol di(meth)acrylate; and (meth)acrylic diesters of an ethylene oxide or propylene oxide adduct such as 2,2-bis{4-(acryloxy.diethoxy)phenyl}propane and 2,2-bis{4-(acryloxy.polypropoxy)phenyl}propane.

Furthermore, epoxy (meth)acrylates, urethane (meth)acrylates and polyester (meth)acylates are also preferably used as the photopolymerizable polyfunctional monomer.

Above all, esters of a polyhydric alcohol and (meth)acrylic acid are preferable. Polyfunctional monomers containing three or more (meth)acryloyl groups in one molecule thereof are more preferable. Specific examples thereof include trimethylolpropane tri(meth)acrylate, trimethylolethane tri (meth)acrylate, 1,2,4-cyclohexane tetra(meth) acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, pentaerythritol triacrylate and tripentaerythritol hexatriacrylate.

Furthermore, for the purpose of controlling the refractive index of each of the layers, a high refractive index monomer as a photopolymerizable polyfunctional monomer can be used. In particular, examples of a high refractive index monomer include bis(4-methacryloylthiophenyl)sulfide, vinylnaphthalene, vinylphenyl sulfide and 4-methacryloxyphenyl-4'-methoxyphenyl)thioether.

Also, dendrimers described in, for example, JP-A-2005-76005 and JP-A-2005-36105 and norbornene ring-containing monomers described in, for example, JP-2005-60425 can also be used.

In the case of using the foregoing curable compound, it is preferred to use a photopolymerization initiator which is used for a polymerization reaction of a photopolymerizable functional monomer. As the photopolymerization initiator, a photo radical polymerization initiator and a photo cationic polymerization initiator are preferable, with the photo radical polymerization initiator being especially preferable. Ille polymerization of the monomer can be carried out in the presence of a photo radical initiator upon irradiation with ionizing radiations.

(Photo Radical Polymerization Initiator)

Examples of the photo radical polymerization initiator include acetophenones, benzoins, benzophenones, phosphine oxides, ketals, anthraquinones, thioxanthones, azo compounds, peroxides (for example, ones described in JP-A-2001-139663), 2,3-dialkyldione compounds, disulfide compounds, fluoroamine compounds, aromatic sulfoniums, onium salts, borate salts and active halogen compounds.

Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)butanone.

Examples of die benzoins include benzoin benzenesulfonic acid ester, benzoin toluenesulfonic acid ester, benzoin methyl ether, benzoin ethyl ether and benzoin isopropyl ether.

Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyl diphenylphosphine oxide.

A variety of examples are described in *Saishin UV Koka Gijutsu* (Latest UV Curing Technologies), page 159 (issuer: Kazuhiro Takasusuki, publishing office: Technical information institute Co., Ltd., published in 1991); and *Shigaisen Koka Shisutemu* (Ultraviolet Ray Curing Systems), pages 65 to 148 (written by Kiyoshi Kato and published by Sogo Gijutsu Center) are useful in the invention.

Preferred examples of commercially available photo radical polymerization initiators of a photo cleavage type include IRGACURE Series (for example, 651, 184, 907, etc.) as trade names of Ciba Japan K.K.

The photopolymerization initiator is preferably used in an amount in the range of from 0.1 to 15 parts by mass, and more preferably from 1 to 10 parts by mass based on 100 parts by mass of the polyfunctional monomer (Photosensitizer)

In addition to the photopolymerization initiator, a photosensitizer may be used. Specific examples of the photosensitizer include n-butylamine, triethylamine, tri-n-butyl phosphine, Michler's ketone and thioxanthone.

Also, in addition to the foregoing compounds, the organosilane compounds described below can be preferably used as the curable compound, <(B) High Refractive Index Fine Particle Having a Refractive Index of 1.55 or More>

The high refractive index fine particle (B) (hereinafter also referred to as "high refractive index fine particle B") having a refractive index of 1.55 or more, which is used in the invention, is, for example, an inorganic fine particle having an average particle size of 2 nm or more and not more than 100 nm, preferably an inorganic fine particle having an average particle size of 5 nm or more and not more than 80 nm, and further preferably an inorganic fine particle having an average particle size of 10 nm or more and not more than 60 nm.

When the average particle size is less than 2 nm, cohesion is easily caused so that the separation is liable to become difficult; whereas when it exceeds 100 mm, the haze is liable to become large.

Examples of the high refractive index fine particle B include the following inorganic fine particles. These inorganic fine particles can be used singly or in admixture of two or more kinds thereof. The average particle size of the high refractive index fine particle B is measured by a Coulter counter.

The high refractive index fine particle B is preferably an oxide particle of at least one element selected from the group consisting of aluminum, zirconium, titanium, zinc, germanium, indium, tin, antimony and cerium. In unevenly distributing such an oxide inorganic fine particle in a lower part of the optical functional layer, for the purposes of making the lower part have a high refractive index and sufficiently reducing the reflectance of the optical film of the invention, it is preferable that the oxide inorganic fine particle has a high refractive index. The refractive index is preferably from 1.60 to 3.00, more preferably from 1.80 to 2.90, and especially preferably from 1.90 to 2.80.

It is especially desired to use at least one oxide of a metal selected from titanium and zirconium. Also, of the both, zirconium which does not have a photo catalytic action is preferable from the viewpoint of light fastness. However, it is also preferable to use titanium having a controlled photo catalytic action.

Also, it is desired to use a conductive inorganic fine particle from the antistatic viewpoints and it is desired to use at least one oxide of a metal selected among indium, zinc, tin and antimony.

The high refractive index fine particle B is also suitably used as an inorganic fine particle for regulating the refractive index in other respective layers to be used in the optical film of the invention, for example, a hard coat layer or a middle refractive index layer.

{Surface Treatment of High Refractive Index Fine Particle B}

Also, it is preferable that the foregoing high refractive index fine particle B is surface-treated. A specific method for the surface treatment is not particularly limited so far as dispersion stabilization can be achieved in a dispersion to be added in the coating composition, or affinity with and binding properties to a resin component such as a binder can be enhanced. With respect to the surface treatment, in addition to ones described in detail in the "Dispersant and surface treating agent of high refractive index fine particle B" item, an organosilane compound, a hydrolyzate of the subject organosilane or a partial condensate of the hydrolyzate of the subject organosilane is preferably used.

[Dispersant and Surface Treating Agent of High Refractive Index Fine Particle B]

In order to achieve dispersion stabilization in a dispersion or a coating solution or to enhance affinity with and binding properties to the binder component, it is preferable that the high refractive index fine particle B which is used in the invention is subjected to a physical surface treatment such as a plasma discharge treatment and a corona discharge treatment or a chemical surface treatment with a surfactant, a coupling agent, etc.

The surface treatment can be carried out using a surface treating agent made of an inorganic compound or an organic compound. Examples of the inorganic compound which is used for the surface treatment include cobalt-containing inorganic compounds (for example, $CoO_2$, $Co_2O_3$, $Co_3O_4$, etc.), aluminum-containing inorganic compounds (for example, $Al_2O_3$, $Al(OH)_3$, etc.), zirconium-containing inorganic compounds (for example, $ZrO_2$, $Zr(OH)_4$, etc.), silicon-containing inorganic compounds (for example, $SiO_2$, etc.) and iron-containing inorganic compounds (for example, $Fe_2O_3$, etc.).

Of these, cobalt-containing inorganic compounds, aluminum-containing inorganic compounds and zirconium-containing inorganic compounds are especially preferable; and cobalt-containing inorganic compounds, $Al(OH)_3$ and $Zr(OH)_4$ are the most preferable.

Examples of the organic compound which is used for the surface treatment include polyols, alkanolamines stearic acid, silane coupling agents and titanate coupling agents. Of these, silane coupling agents are the most preferable. It is especially preferable that the surface treatment is carried out by using at least one member of silane coupling agents (for example, organosilane compounds) and partial hydrolyzates or condensates thereof.

Examples of the titanate coupling agent include metal alkoxides such as tetramethoxytitanium, tetraethoxytitanium and tetraisopropoxytitanium, and PLENACT Series (for example, KR-TTS, KR-46B. KR-55 and KR-41B, all of which axe manufactured by Ajinomoto Co., Inc., etc.).

As the organic compound which is used for the surface treatment, polyols and alkanolamines and besides, anionic group-containing organic compounds are preferable; and organic compounds containing a carboxyl group, a sulfonic acid group or a phosphoric acid group are especially preferable, Stearic acid, lauric acid, oleic acid, linoleic acid, linolenic acid and so on can be preferably used.

It is preferable that the organic compound which is used for the surface treatment further contains a crosslinking or polymerizable functional group. Examples of the crosslinking or polymerizable functional group include ethylenically unsaturated groups capable of undergoing an addition reaction or polymerization reaction by a radical species (for example, a (meth)acryl group, an allyl group, a stearyl group, a vinyloxy group, etc.), cationically polymerizable groups (for example, an epoxy group, an oxatanyl group, a vinyloxy group, etc.) and polycondensation reactive groups (for example, a hydrolyzable silyl group, an N-methylol group, etc.). Of these, groups having an ethylenically unsaturated group are preferable.

A combination of two or more kinds of such surface treating agents can be adopted. A combined use of an aluminum-containing inorganic compound and a zirconium-containing inorganic compound is especially preferable.

For the surface treatment, a coupling agent is preferably used; too. Alkoxy metal compounds (for example, titanium coupling agents or silane coupling agents) are preferably used as the coupling agent. Above all, a silane coupling treatment is especially effective. The silane coupling agent may be used as a partial hydrolyzate or condensate thereof.

The foregoing coupling agent is used for undergoing a surface treatment in advance prior to the preparation of a coating solution as a surface treating agent of an inorganic fine particle. It is preferred to incorporate the coupling agent in the subject layer by further addition as an additive at the time of preparation of the coating solution for the layer.

For the purpose of reducing a load of the surface treatment, it is preferable that the high refractive index fine particle B is dispersed in advance in a medium prior to the surface treatment.

Specific examples of the surface treating agent and the catalyst for the surface treatment which can be preferably used in the invention include organosilane compounds and catalysts described in, for example, WO 2004/017105.

A variety of dispersants as described below can be used for dispersing the high refractive index fine particle B which is used in the invention.

It is preferable that the dispersant further contains a crosslinking or polymerizable functional group. Examples of the crosslinking or polymerizable functional group include ethylenically unsaturated groups capable of undergoing an addition reaction or polymerization reaction by a radical species (for example, a (meth)acryl group, an allyl group, a stearyl group, a vinyloxy group, etc.), cationically polymerizable groups (for example, an epoxy group, an oxatanyl group, a vinyloxy group, etc.) and polycondensation reactive groups (for example, a hydrolyzable silyl group or an N-methyol group). Of these, functional groups having an ethylenically unsaturated group are preferable.

For dispersing the high refractive index fine particle B, in particular, dispersing an inorganic particle composed of, as a major component, $TiO_2$, it is preferred to use a dispersant containing an anionic group. It is more preferable that the dispersant contains an anionic group and a crosslinking or polymerizable functional group. It is especially preferable that the subject crosslinking or polymerizable functional group is contained in a side chain of the dispersant. As specific examples of the crosslinking or polymerizable functional group, the foregoing functional groups can be exemplified.

As the anionic group, groups having an acidic proton such as a carboxyl group) a sulfonic acid group (sulfo), a phosphoric acid group (phosphono) and a sulfonamide group, or salts thereof are effective. Of these, a carboxyl group, a sulfonic acid group, a phosphoric acid group, or a salt thereof is preferable, with a carboxyl group or a phosphoric acid group being especially preferable. With respect to the number of the anionic group per molecule to be contained in the dispersant plural kinds may be contained in one molecule. The number of the anionic group per molecule is preferably two or more) more preferably five or more, and especially preferably ten or more in average. Also, plural kinds of anionic groups to be contained in the dispersant may be contained in one molecule.

In the dispersant having an anionic group in a side chain thereof, the composition of an anionic group-containing repeating unit is in the range of from $10^{-4}$ to 100% by mole, preferably from 1 to 50% by mole) and especially preferably from 5 to 20% by mole of the whole of the repeating units.

The number of the crosslinking or polymerizable functional group per molecule to be contained in the dispersant is preferably two or more, more preferably five or more, and especially preferably ten or more in average. Also, plural kinds of crosslinking or polymerizable functional groups to be contained in the dispersant may be contained in one molecule.

In the preferred dispersant which is used in the invention, as the repeating unit containing an ethylenically unsaturated group in a side chain thereof a repeating unit of a poly-1,2-butadiene or poly-1,2-isoprene structure or a (meth)acrylic ester or amide, to which is bound a specified residue (an R group in —COOR or —CONHR), can be utilized. Examples of the foregoing specified residue (R group) include —$(CH_2)_n$—$CR_{21}$=$CR_{22}R_{23}$, —$(CH_2O)_n$—$CH_2CR_{21}$=$CR_{22}R_{23}$, —$(CH_2CH_2O)_n$—$CH_2$—$CR_{21}$=$CR_{22}R_{23}$, —$(CH_2)_n$—NH—CO—O—$CH_2CR_{21}$=$CR_{22}R_{23}$, —$(CH_2)_n$—O—CO—$CR_{21}$=$CR_{22}R_{23}$ and —$(CH_2CH_2O)_2$—X (wherein $R_{21}$ to $R_{23}$ each represents a hydrogen atom, a halogen atom, an alkyl group having from 1 to 20 carbon atoms, an aryl group, an alkoxy group or an aryloxy group; $R_{21}$ and $R_{22}$ or $R_{23}$ may be taken together to form a ring; n represents an integer of from 1 to 10;

and X represents a dicyclopentadienyl residue). Specific examples of R of the ester residue include —$CH_2CH=CH_2$ (corresponding to a polymer of allyl (meth)acrylates described in JP-A-64-17047), —$CH_2CH_2O$—$CH_2CH=CH_2$, —$CH_2CH_2OCOCH=CH_2$, —$CH_2CH_2OCOC(CH_3)=CH_2$, —$CH_2C(CH_3)=CH_2$, —$CH_2CH=CH$—$C_6H_5$, —$CH_2CH_2OCOCH=CH$—$C_6H_5$, —$CH_2CH_2$—$NHCOO$—$CH_2CH=CH_2$ and —$CH_2CH_2O$—X (wherein X represents a dicyclopentadienyl residue). Specific examples of R of the amide reside include —$CH_2CH=CH_2$, —$CH_2CH_2$—Y (wherein Y represents a 1-cyclohexenyl residue), —$CH_2CH_2$—OCO—$CH=CH_2$ and —$CH_2CH_2$—OCO—$C(CH_3)=CH_2$.

In the foregoing dispersant having an ethylenically unsaturated group, a free radical (a polymerization initiation radical or a growth radical in a polymerization process of a polymerizable compound) is added to the unsaturated group, and addition polymerization is caused directly between the molecules or via a polymerization chain of the polymerizable compound, whereby crosslinking is formed between the molecules to cause curing. Alternatively, an atom in the molecule (for example, a hydrogen atom on a carbon atom adjacent to the unsaturated binding group) is withdrawn by the free radical to form polymer radicals which are then bound to each other, whereby crosslinking is formed between the molecules to cause curing.

Though the weight average molecular weight (Mw) of the dispersant having an anionic group and a crosslinking or polymerizable functional group and having the subject crosslinking or polymerizable functional group in a side chain thereof is not particularly limited, it is preferably 1,000 or more. The weight average molecular weight (Mw) of the dispersant is more preferably from 2,000 to 1,000,000, further preferably from 5,000 to 200,000, and especially preferably from 10,000 to 100,000.

Though the crosslinking or polymerizable functional group-containing unit may constitute all of the repeating units other than the anionic group-containing repeating unit, it preferably accounts for from 5 to 50% by mole, and especially preferably from 5 to 30% by mole of the whole of the crosslinking or repeating units.

The dispersant may be a copolymer with a suitable monomer other than the monomer having a crosslinking or polymerizable functional group and an anionic group. Though the copolymerization component is not particularly limited, it is selected from various viewpoints such as dispersion stability, compatibility with other monomer component and strength of a formed film. Preferred example thereof include methyl (meth)acrylate, n-butyl (meth)acrylate, t-butyl (meth)acrylate, cyclohexyl (meth)acrylate and styrene.

Though the form of the dispersant is not particularly limited, it is preferably a form of a block copolymer or a random copolymer. It is especially preferably a form of a random copolymer in view of cost and easiness for synthesis.

The use amount of the dispersant relative to the high refractive index fine particle B is preferably in the range of from 1 to 50% by mass, more preferably in the range of from 5 to 30% by mass, and most preferably in the range of boom 5 to 20% by mass. Furthermore, two or more kinds of dispersants may be used in combination. Details of the dispersant which is preferably used are described in JP-A-2007-293313.

[Dispersion of High Refractive Index Fine Particle B]

The high refractive index fine particle B can be dispersed using a dispersion machine. Examples of the dispersion machine include a sand grinder mill (for example, a pin-provided bead mill), a high-speed impeller mill, a pebble mill, a roller mill, an attritor and a colloid mill. Of these, a sand grinder mill and a high-speed impeller mill are especially preferable. Furthermore, a preliminary dispersion treatment may be carried out. Examples of a dispersion machine, which is used for the preliminary dispersion treatment include a ball mill, a three-roll mill, a kneader and an extruder.

It is preferable that the high refractive index fine particle B is atomized in the dispersion medium as far as possible. Its weight average particle preferably follows the foregoing particle size.

{Surface Free Energy of High Refractive Index Fine Particle B}

It is preferable torn the standpoint of advantageously forming a layer separation structure that the surface free energy of the high refractive index fine particle B is higher than the surface free energy of the fluorine-containing compound and higher than that of the low refractive index fine particle. The surface free energy of the high refractive index fine particle B is preferably 55 mN/m or more, more preferably 55 mN/m or more and not more than 70 mN/m, and especially preferably 55 mN/m or more and not more than 65 mN/m. By making the surface free energy of the high refractive index fine particle B fall within the foregoing range, the layer separation structure is easily formed. On the other hand, when the surface free energy of the high refractive index fine particle B is too high, a lowering of reflectance, unevenness, etc. may be possibly generated. The surface free energy is preferably controlled so as to fall within the foregoing range from the viewpoints of strength and coating properties.

The surface free energy of the high refractive index fine particle B can be calculated using a contact angle of the high refractive index fine particle B against water and methylene iodide, which is obtained by, after stationary sedimentation or centrifugation of a coating composition, repeating rinsing with a solvent to remove components other than the high refractive index fine particle B, casting it on a rinsed glass plate, drying the solvent and forming it into a thin film. The surface free energy of other components such as resin components can be similarly calculated.

A blending proportion of the high refractive index fine particle B in the optical functional layer is preferably in the range of from 30% by mass to 50% by mass, and more preferably in the range of from 30% by mass to 40% by mass relative to the whole of solids of the optical functional layer.

<(A) Low Refractive Index Fine Particle Having a Refractive Index of not More than 1.45>

The low refractive index fine particle (A) (hereinafter also referred to as "low refractive index fine particle A") having a refractive index of not more than 1.45, which is used in the invention, is, for example, an inorganic fine particle having an average particle size of 10 nm or more and not more than 100 nm, preferably an inorganic fine particle having an average particle size of 15 nm or more and not more than 80 nm, and further preferably an inorganic fine particle having an average particle size of 20 nm or more and not more than 60 nm. The refractive index of the low refractive index fine particle A is not more than 1.45, preferably from 1.17 to 1.45, more preferably from 1.17 to 1.40, further preferably from 1.17 to 1.35, and most preferably from 1.17 to 1.32. In order that the low refractive index fine particle A may be maldistributed in an upper part of the optical functional layer, thereby contributing to an enhancement of the scratch resistance and a reduction of the refractive index, it is desirable that the low refractive index fine particle A has a low refractive index.

Examples of the low refractive index fine particle A include the following inorganic fine particles. These inorganic fine particles can be used singly or in admixture of two or more kinds thereof.

Specific examples of the low refractive index fine particle A include fine particles of magnesium fluoride and silicon oxide (silica). In view of refractive index, dispersion stability and cost, a silica fine particle is especially preferable.

When the particle size of the low refractive index fine particle A is too small, an effect for improving the scratch resistance becomes low, whereas when it is too large, fine irregularities are formed on the surface of the optical functional layer and the appearance such as deep black and integrated reflectance an deteriorated. Thus, it is preferred to control the particle size of the low refractive index fine particle A to the foregoing range. The low refractive index fine particle A may be either crystalline or amorphous; it may be a monodispersed particle; and so far as a prescribed particle size is met, it may be a cohered particle. Through the shape of the low refractive index fine particle A is most preferably spherical, even when it is amorphous, there is no problem.

Here, the average particle size of the low refractive index fine particle A is measured by a Coulter counter.

It is further preferable that the low refractive index fine particle A has a hollow structure. In the case of an inorganic fine particle of a hollow structure, the refractive index does not express a refractive index of only the inorganic material as an outer shell but expresses an average value of the whole of the particle. At that time, when a radius of a void within the particle is defined as "a", and a radius of the outer shell of the particle is defined as "b", a porosity x which is expressed by the following numerical expression (II):

$$x=(4\pi a^3/3)/(4\pi b^3/3)\times 100 \qquad \text{Expression (II)}$$

is preferably from 10 to 60%, more preferably from 20 to 60%, and most preferably from 30 to 60%.

When it is intended to make the hollow low refractive index fine particle A so as to have a lower refractive index and a larger porosity, the thickness of only the outer shell becomes thin so that the strength as the particle is weakened. Accordingly, a particle having a low refractive index of less than 1.17 is not preferable from the viewpoint of scratch resistance. The refractive index of the inorganic fine particle can be measured by an Abbe's refractometer (manufactured by Atago Co., Ltd.).

The amount of the low refractive index fine particle A is preferably in the range of from 5% by mass to 15% by mass, more preferably from 8% by mass to 15% by mass, and especially preferably from 10% by mass to 15% by mass relative to the whole of solids of the optical functional layer. When the amount of the low refractive index fine particle A is too high, the low refractive index fine particle A is cohered and maldistributed in a lower part in the high refractive index fine particle layer, whereby the effect for reducing the reflectance is lowered. Also, when the amount of the low refractive index fine particle A is too low, the number of particles which are maldistributed on the surface decreases) whereby not only the effect for reducing the reflectance is lowered, but the physical strength of the optical functional layer is weakened.

The low refractive index fine particle A is especially preferably a silica fine particle or a hollow silica fine particles {Surface Treatment of Low Refractive Index Fine Particle A}

In order to achieve dispersion stabilization in a dispersion or a coating solution or to enhance affinity with and binding properties to the binder component, the low refractive index fine particle A may be subjected to a physical surface treatment such as a plasma discharge treatment and a corona discharge treatment or a chemical surface treatment with a surfactant, a coupling agent etc. Above all, the use of a coupling agent is especially preferable. Alkoxy metal compounds (for example, titanium coupling agents or silane coupling agents) are preferably used as the coupling agent. Above all, a silane coupling treatment is especially effective.

Furthermore, it is desirable that the silane coupling agent does not contain a fluorine atom. When the low refractive index fine particle A is surface-treated with a fluorine atom-free silane coupling agent, the compatibility of the low refractive index fine particle A with (C) the fluorine compound decreases, and the low refractive index fine particle A is not completely taken into the fluorine compound, whereby the separation proceeds, and it is easily maldistributed on the surface. Accordingly, such is advantageous in forming the layer separation structure of the invention. When the silane coupling agent contains a fluorine atom, there is a possibility that the low refractive index fine particle A is not arranged in a line on the surface but distributed even in the inside of the optical functional layer, whereby the reflectance increases, and the scratch resistance is deteriorated.

It is preferable that the foregoing coupling agent is used for undergoing a surface treatment in advance prior to the preparation of a coating solution as a surface treating agent of the low refractive index fine particle A. It is preferred to incorporate the coupling agent in the subject layer by further addition as an additive at the time of preparation of the coating solution for the layer.

For the prose of reducing a load of the surface treatment, it is preferable that the low refractive index fine particle A is dispersed in advance in a medium prior to the surface treatment.

<Silane Coupling Agent>

It is preferable from the standpoints of scratch resistance and surface free energy that at least one member selected among an organosilane compound, a hydrolyzate of the subject organosilane compound and a partial condensate of the hydrolyzate of the subject organosilane compound (the resulting reaction solution will be hereinafter sometimes referred to as "sol component") is incorporated as the surface treating agent of the low refractive index fine particle A.

Such a component functions as a binder such that after coating, the foregoing coating composition is condensed in drying and heating steps to form a cured material. Also, in the invention, since the foregoing fluorine-containing polymer is preferably incorporated as the fluorine-containing compound, a binder having a three-dimensional structure is formed upon irradiation with active rays.

The foregoing organosilane compound is preferably one represented by the following formula (1).

Formula (1)

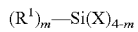

$(R^1)_m—Si(X)_{4-m}$

In the foregoing formula (1), $R^1$ represents a substituted or unsubstituted alkyl group or a substituted or unsubstituted aryl group. Examples of the alkyl group include methyl, ethyl, propyl, isopropyl, hexyl, decyl and hexadecyl. The alkyl group preferably has from 1 to 30 carbon atoms, more preferably from 1 to 16 carbon atoms, and especially preferably from 1 to 6 carbon atoms. Examples of the aryl group include phenyl and naphthyl, with a phenyl group being preferable.

X represents a hydroxyl group or a hydrolyzable group. Examples of the hydrolyzable group include an alkoxy group (preferably an alkoxy group having from 1 to 6 carbon atoms, for example, a methoxy group and an ethoxy group), a halogen atom (for example, Cl, Br, I, etc.) and $R_2COO$ (wherein $R_2$ is preferably a hydrogen atom or an alkyl group having from 1 to 5 carbon atoms; and examples thereof include CH$_3$COO and C$_2$H$_5$COO). Of these, an alkoxy group is preferable; and a methoxy group and an ethoxy group are especially preferable.

m represents an integer of from 1 to 3, preferably 1 or 2, and especially preferably 1.

when plural R$_1$s or Xs are present, the plural R$_1$s or Xs may be the same or different.

The substituent which is contained in R$_1$ is not particularly limited, and examples thereof include a halogen atom (for example, fluorine, chlorine, bromine, etc.), a hydroxyl group, a mercapto group, a carboxyl group, an epoxy group, an alkyl group (for example, methyl, ethyl, isopropyl, propyl, t-butyl, etc.), an aryl group (for example, phenyl, naphthyl, etc.), an aromatic heterocyclic group (for example, furyl, pyrazolyl, pyridyl, etc.), an alkoxy group (for example, methoxy, ethoxy, isopropoxy, hexyloxy, etc.), an aryloxy group (for example, phenoxy, etc.), an alkylthio group (for example, methylthio, ethylthio, etc.), an arylthio group (for example, phenylthio, etc.), an alkenyl group (for example, vinyl, 1-propenyl, etc.), an acyloxy group (for example, acetoxy, acryloyloxy, methacryloyloxy, etc.), an alkoxycarbonyl group (for example, methoxycarbonyl, ethoxycarbonyl, etc.), an aryloxycarbonyl group (for example, phenoxycarbonyl, etc.), a carbamoyl group (for example, carbamoyl, N-methylcarbamoyl, N,N-dimethylcarbamoyl, N-methyl-N-octylcarbamoyl, etc.) and an acylamino group (for example, acetylamino, benzoylamino, acrylamino, methacrylamino, etc). Such a substituent may be further substituted.

In the case where plural R$_1$s are present, it is preferable that at least one of them is a substituted alkyl group or a substituted aryl group. Among the organosilane compounds represented by the foregoing formula (1), an organosilane compound having a vinyl polymerizable substituent represented by the following formula (2) is preferable.

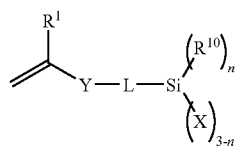

Formula (2)

(2)

In the foregoing formula (2), R$^{10}$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. Above all, a hydrogen atom, a methyl group, a methoxy group, a methoxycarbonyl group, a cyano group, a fluorine atom and a chlorine atom are preferable; a hydrogen atom, a methyl group, a methoxycarbonyl group, a fluorine atom and a chlorine atom are more preferable; and a hydrogen atom and a methyl group are especially preferable.

Y represents a single bond, *—COO—**, *—CONH—** or *—O—**. Of these, a single bond, *—COO—** and *—CONH—** are preferable; a single bond and *—COO—** are more preferable; and *—COO—** is especially preferable. Here, * represents the binding position to =C(R$^1$); and ** represents the binding position to L.

L represents a divalent connecting chain. Specific examples thereof include a substituted or unsubstituted alkylene group, a substituted or unsubstituted arylene group, a substituted or unsubstituted alkylene group having a connecting group (for example, ethers, esters, amides, etc.) therein and a substituted or unsubstituted arylene group containing a connecting group therein. Of these, a substituted or unsubstituted alkylene group, a substituted or unsubstituted arylene group and an alkylene group having a connecting group therein are preferable; an unsubstituted alkylene group, an unsubstituted alene group and an alkylene group having an other or ester connecting group therein are more preferable; and an unsubstituted alkylene group and an alkylene group having an ether or ester connecting group therein are especially preferable. Examples of the substituent include a halogen, a hydroxyl group, a mercapto group, a carboxyl group, an epoxy group, an alkyl group and a aryl group. Such a substituent may be further substituted.

n represents 0 or 1. When plural Xs are present, the plural Xs may be the same or different. n is preferably 0.

R$^1$ is synonymous with R$^1$ in the formula (1) and is preferably a substituted or unsubstituted alkyl group or an unsubstituted aryl group, and more preferably an unsubstituted alkyl group or an unsubstituted aryl group.

X is synonymous with X in the formula (1), Above all, a halogen atom, a hydroxyl group and an unsubstituted alkoxy group are preferable; a chlorine atom, a hydroxyl group and an alkoxy group having from 1 to 6 carbon atoms are more preferable; a hydroxyl group and an alkoxy group having from 1 to 3 carbon atoms are further preferable; and a methoxy group is especially preferable.

The compound of the foregoing formula (1) or formula (2) may be used in combination of two or more kinds thereof. Specific examples of the compound represented by the formula (1) or formula (2) will be given below, but it should not be construed that the invention is limited thereto.

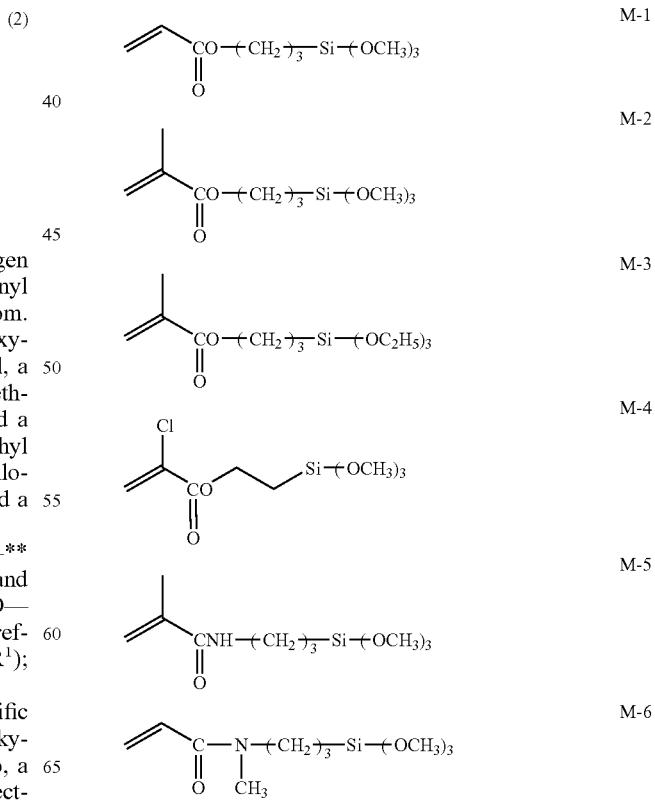

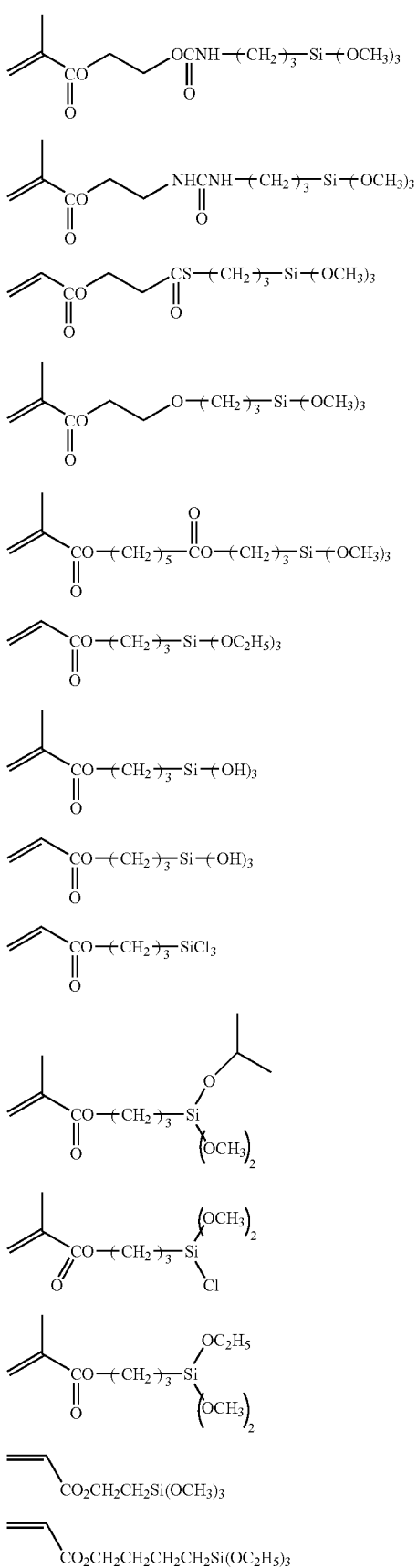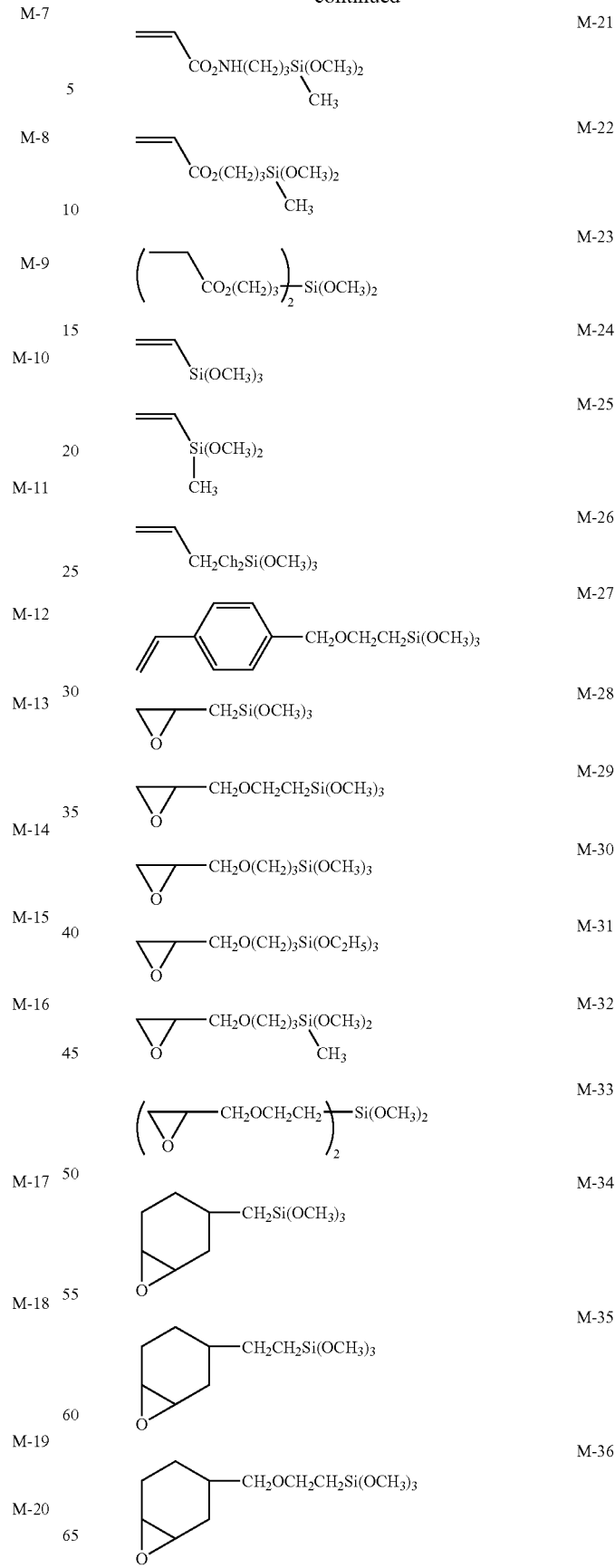

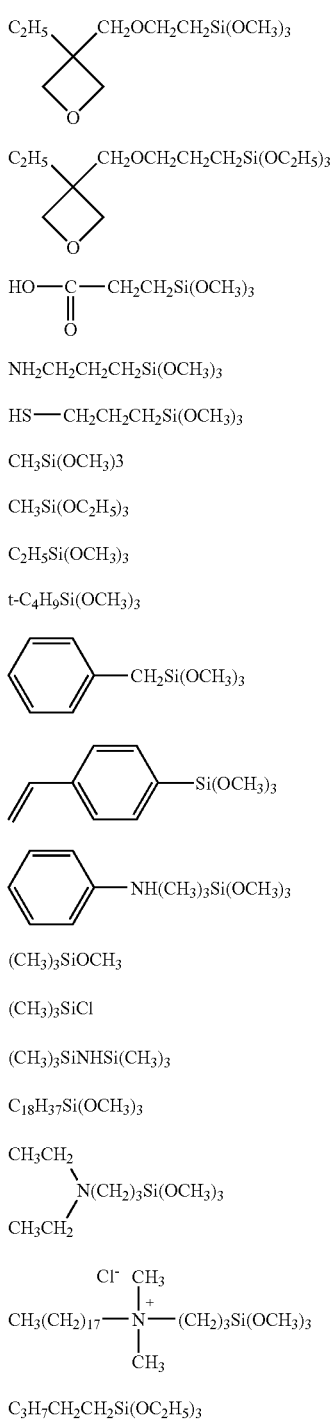

M-37
M-38
M-39
M-40
M-41
M-42
M-43
M-44
M-45
M-46
M-47
M-48
M-49
M-50
M-51
M-52
M-53
M-54
M-55

Of the compounds represented by the foregoing M-1 to M-55, M-1, M-2 and M-49 are preferable. In the invention, through the use amount of the silane coupling agent represented by the formula (1) is not particularly limited, it is preferably from 1% by mass to 30% by mass, more preferably from 3% by mass to 100% by mass, and most preferably from 5% by mass to 50% by mass per the low refractive index fine particle. By regulating the addition amount of the silane coupling agent, the treatment state on the surface of the low refractive index fine particle can be regulated, thereby enabling one to regulate the condition suitable for the formation of the layer separation structure of the invention.

In generals a hydrolyzate of the foregoing organosilane compound and/or a partial condensate thereof is produced by treating the foregoing organosilane compound in the presence of a catalyst. Examples of the catalyst include inorganic acids such as hydrochloric acid, sulfuric acid and nitric acid; organic acids such as oxalic acid, acetic acid) formic acid, methanesulfonic acid and toluenesulfonic acid; inorganic bases such as sodium hydroxide, potassium hydroxide and ammonia; organic bases such as triethylamine and pyridine; metal alkoxides such as triisopropoxyaluminum and tetrabutoxyzirconium; and metal chelate compounds containing a metal (for example, Zr, Ti, Al, etc.) as a central metal, in the invention, it is preferred to use a metal chelate compound or an acid catalyst such as inorganic acids and organic acids, Hydrochloric acid and sulfinic acid are preferable as the inorganic acid; and ones having an acid dissociation constant (pKa value (at 25° C.)) in water of not more than 4.5 are preferable as the organic acid, Hydrochloric acid, sulfuric acid and an organic acid having an acid dissociation constant in water of not more than 3.0 are more preferable; hydrochloric acids sulfuric acid and an organic acid having an acid dissociation constant in water of not more than 2.5 are further preferable; and an organic acid having an acid dissociation constant in water of not more than 2.5 is especially preferable. Concretely, methanesulfonic acid, oxalic acid, phthalic acid and malonic acid are preferable, with oxalic acid being especially preferable.

As the metal chelate compound, ones containing, as a central metal, a metal selected from Zr, Ti and Al, in which an alcohol represented by the formula, $R^3OH$ (wherein $R^3$ represents an alkyl group having from 1 to 10 carbon atoms) and a compound represented by the formula, $R^4COCH_2COR^5$ (wherein $R^4$ represents an alkyl group having from 1 to 10 carbon atoms; and $R^5$ represents an alkyl group having from 1 to 10 carbon atoms or an alkoxy group having from 1 to 10 carbon atoms) function as ligands, can be suitably used without particular limitations. Two or more kinds of metal chelate compounds may be used in combination within this scope. The metal chelate compound which is used in the invention is preferably selected from the group of compounds represented by the formulae, $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$ and acts to accelerate a condensation reaction of a hydrolyzate of the foregoing organosilane compound and/or a partial condensate thereof.

In the foregoing metal chelate compounds, $R^3$ and $R^4$ may be the same or different and each represents an alkyl group having from 1 to 10 carbon atoms. Specific examples of the alkyl group include an ethyl group, an n-propyl group, an isopropyl group, an n-butyl group, a sec-butyl group, a t-butyl group and an n-pentyl group. Also, $R^5$ represents an alkyl group having from 1 to 10 carbon atoms the same as in the foregoing or an alkoxy group having from 1 to 10 carbon atoms. Examples of the alkoxy group include a methoxy group, an ethoxy group, an n-propoxy group, an isopropoxy group, an n-butoxy group, a sec-butoxy group and a t-butoxy group. Also, in the foregoing metal chelate compounds, p1, p2, q1, q2, r1 and r2 each represents an integer which is determined such that the relations: (p1+p2)=4, (q1+q2)=4 and (r1+r2)=3 are satisfied.

Specific examples of such a metal chelate compound include zirconium chelate compounds such as zirconium tri-n-butoxyethylacetoacetate, zirconium di-n-butoxybis(ethylacetoacetate), zirconium-butoxytris(ethylacetoacetate), zirconium tetrakis(n-propylaetoacetate), zirconium tetrakis (acetylacetoacetate) and zirconium tetrakis (ethylacetoacetate); titanium chelate compounds such as titanium diisopropoxy.bis(ethylacetoacetate), titanium diisopropoxy.bis(acetylacetate), and titanium diisopropoxy.bis (acetylcetone); and aluminum chelate compounds such as aluminum diisopropoxyethylacetoacetate, aluminum diisopropoxyacetylacetate, aluminum isopropoxybis(ethylacetoacetate), aluminum isopropoxybis(acetylacetonate), aluminum tris(ethylacetoacetate), aluminum tris (acetylacetonate) and aluminum monoacetylacetonato.bis (ethylacetoacetate).

Of the foregoing specific examples of metal chelate compound, zirconium tri-n-butoxyethylacetoacetate, titanium diisopropoxybis(acetylacetonate), aluminum diisopropoxyethylacetoacetate and aluminum tris(ethylacetoacetate) are preferable. Such a metal chelate compound can be used singly or in admixture of two or more kinds thereof. A partial hydrolyzate of such a metal chelate compound can also be used.

In the invention, it is preferable that a β-diketone compound and/or a β-ketoester compound is further added. This is further described below.

The compound which is used in the invention is a β-diketone compound and/or a β-ketoester compound represented by the formula, $R^4COCH_2COR^5$ and acts as a stability enhancing agent of the surface treating agent which is used in the invention. Here, $R^4$ represents an alkyl group having from 1 to 10 carbon atoms; and $R^5$ represents an alkyl group having from 1 to 10 carbon atoms or an alkoxy group having from 1 to 10 carbon atoms. That is, it may be considered that when this compound coordinates with the metal atom in the metal chelate compound (for example, zirconium, titanium and/or aluminum compounds), it inhibits an action to accelerate a condensation reaction of a hydrolyzate of the organosilane compound and/or a partial condensate thereof by such a metal chelate compound, thereby acting to enhance the storage stability of the resulting surface treating agent $R^4$ and $R^5$ which constitute the β-diketone compound and/or β-ketoester compound are synonymous with $R^4$ and $R^5$ which constitute the foregoing metal chelate compound.

Specific examples of this β-diketone compound and/or β-ketoester compound include acetylacetone, methyl acetoacetate, ethyl acetoacetate, n-propyl acetoacetate, isopropyl acetoacetate, n-butyl acetoacetate, sec-butyl acetoacetate, t-butyl acetoacetate, 2,3-hexane-dione, 2,4-heptane-dione, 3,5-heptane-dione, 2,4-octane-dione, 2,4-nonane dione and 5-methylhexane-dione. Of these, ethyl acetoacetate and acetylacetone are preferable; and acetylacetone is especially preferable. Such a β-diketone compound and/or β-ketoester compound can be used singly or in admixture of two or more kinds thereof. In the invention, the β-diketone compound and/or β-ketoester compound is preferably used in an amount of 2 moles or more, and more preferably from 3 to 20 moles per mole of the metal chelate compound. Satisfactory storage stability is obtained within the foregoing range.

{Surface Free Energy of Low Refractive Index Fine Particle A}

It is preferable from the standpoint of maldistribution of the low refractive index fine particle A in an upper part of the layer that the surface free energy of the low refractive index fine particle A is lower than the surface free energy of the high refractive index fine particle B and that the surface free energy of the low refractive index fine particle A is front 35 to 55 mN/m or more. The surface free energy of the low refractive index fine particle A is more preferably from 35 to 50 mN/m, and most preferably from 35 to 45 mN/m. By making the surface free energy of the low refractive index fine particle A fall within the foregoing range, when the coating composition is coated, the both particles are easily separated to form a layer. The surface free energy can be measured in the same method as in the surface free energy of the foregoing high refractive index fine particle B.

<Organic Solvent>

As an organic solvent which is used for the coating composition in the invention, a variety of solvents which are selected from the viewpoints that each component can be dissolved or dispersed therein; that uniform surface properties are liable to be obtained in a coating step and a drying step; that liquid preservability can be ensured; and that they have a proper saturated vapor pressure can be used.

The solvent may be used singly or in admixture of two ort more kinds thereof. In particular, it is preferable from the viewpoint of a drying load that a solvent having a boiling point of not higher than 100° C. at room temperature under atmospheric pressure is used as a major components whereas a small amount of a solvent having a boiling point of 100° C. or higher is contained for the purpose of adjusting the drying speed (the amount of the solvent having a boiling point of 100° C. or higher is preferably from 1 to 50 parts by masse more preferably from 2 to 40 parts by mass, and especially preferably from 3 to 30 pas by mass based on 100 parts by mass of the solvent having a boiling point of 100° C. of higher). By using at least two kinds of organic solvents having a different boiling point from each other, the high refractive index fine particle B is easily maldistributed in a lower part.

Examples of the solvent having a boiling point of not higher than 100° C. include hydrocarbons such as hexane (boiling point: 68.7° C.), heptane (boiling point: 98.4° C., cyclohexane (boiling point: 80.7° C.) and benzene (boiling point: 80.1° C.); halogenated hydrocarbons such as dichloromethane (boiling point 39.8° C.), chloroform (boiling point: 61.2° C.), carbon tetrachloride (boiling point: 76.8° C.), 1,2-dichloroethane (boiling point: 83.5° C.) and trichloroethylene (boiling point: 87.2° C.); ethers such as diethyl ether (boiling point: 34.6° C.), diisopropyl ether (boiling point: 68.5° C.), dipropyl ether (boiling point: 90.5° C.) and tetrahydrofuran (boiling point: 66° C.); esters such as ethyl formate (boiling point: 54.2° C.), methyl acetate (boiling point: 57.8° C.), ethyl acetate (boiling point: 77.1° C.) and isopropylacetate (boiling point: 89° C.); ketones such as acetone (boiling point: 56.1° C.) and 2-butanone (the same as methyl ethyl ketone, boiling point: 79.6° C.); alcohols such as methanol (boiling point: 64.5° C.), ethanol (boiling point: 78.3° C.), 2-propanol (boiling point: 82.4° C.) and 1-propanol (boiling point: 97.2° C.); cyano compounds such as acetonitrile (boiling point: 81.6° C. and propionitrile (boiling point: 97.4° C.); and carbon disulfide (boiling point: 46.2° C.). Of these, ketones and esters are preferable; and ketones are especially preferable. Among the ketones, 2-butanol is especially preferable.

Examples of the solvent having a boiling point of 100° C. or higher include octane (boiling point: 125.7° C.), toluene (boiling point: 110.6° C.), xylene (boiling point: 138° C.), tetrachloroethylene (boiling point: 121.2° C.), chlorobenzene (boiling point: 131.7° C.), dioxane (boiling point: 101.3° C.), dibutyl ether (boiling point: 142.4° C.), isobutyl acetate (boiling point: 118° C.), cyclohexanone (boiling point: 155.7° C.), 2-methyl-4-pentanone (the same as MIBK, boiling point: 115.9° C.), 1-butanol (boiling point: 117.7° C.), N,N-dimethylformamide (boiling point: 153° C.), N,N-dimethylacetamide (boiling point: 166° C.) and dimethyl sulfoxide (boiling point: 189° C.). Of these, cyclohexanone and 2-methyl-4-pentanone are preferable.

As another preferred embodiment of using two or more kinds of organic solvents, the use of two kinds of solvents in which a difference in the boiling point is larger than a specified value is exemplified. The difference in the boiling point between the two kinds of solvents is preferably 25° C. or more, especially preferably 35° C. or more, and f-her preferably 50° C. or more. When the difference in the boiling point is large, the high refractive index fine particle (B) is easily maldistributed in a lower part.

As to the blending proportion of the organic solvent, the organic solvent is added such that the solids concentration is preferably from 2 to 30% by mass, more preferably from 3 to 20% by mass, and especially preferably from 5 to 15% by mass. When the solids concentration is too low, there is a concern that it takes a time to conduct drying, or unevenness in thickness to be caused due to drying likely occurs. On the other had, ashen the solids concentration is too high, there is a concern that maldistribution of the particle does not sufficiently occur, or the coating amount becomes small, whereby coating unevenness likely occurs.

In the coating composition of the invention, in addition to the foregoing respective components, other additives can be added and used. As other additives which can be used in the invention, the following additives are exemplified.

<Leveling Agent>

For the purpose of preventing unevenness, various leveling agents can be used Concretely, a fluorine based leveling agent or a silicone based leveling agent is preferable as the leveling agent. In particular, a fluorine based leveling agent is more preferable because an ability to prevent unevenness is high.

Also, M the leveling agent, an oligomer or a polymer is more preferable than a low molecular weight compound.

As such a monomer, ones described in *Polymer Handbook, 2nd Ed.*, J. Brandrup, Wiley Interscience (1975), Chapter 2, page 1 to 483 can be used.

Examples thereof include compounds having one addition polymerizable unsaturated bond selected among acrylic acid, methacrylic acid, acrylic esters, methacrylic esters, acrylamides, methacrylamides, allyl compounds, vinyl ethers vinyl esters and the like.

Examples of the silicone based leveling agent include polydimethylsiloxanes in which a side chain thereof or a terminal end of a principal chain thereof is modified with various substituents such as oligomers of ethylene glycol, propylene glycol, etc., and specific examples thereof include KF-96 and X-22-945, all of which are manufactured by Shin-Etsu Chemical Co., Ltd. Besides, nonionic surfactants in which a hydrophobic group thereof is constituted of a dimethyl polysiloxane and a hydrophilic group thereof is constituted of a polyoxyalkylene can also be preferably used. The addition amount of the fluorine based leveling agent is preferably from 0.001% by mass to 1.0% by mass, and more preferably from 0.01% by mass to 0.2% by mass relative to the coating solution.

A thickener can be used for the purpose of regulating the viscosity of the coating composition. The "Thickener" as referred to herein means a substance capable of increasing the viscosity of the solution upon addition of the same.

Details of the leveling agent and the thickener are described in JP-A-2007-293313.

[Underlying Layer]

As an underlying layer of the optical functional layer which is formed from the foregoing coating composition, a hard coat layer is preferable. It is preferable that the hard coat layer is formed from a composition containing at least one of the foregoing curable compound and high refractive index fine particle. By incorporating at least one of these two components, adhesion between the layers can be enhanced, the scratch resistance can be enhanced, or the high refractive index fine particle B can be easily maldistributed in a lower part within the optical frictional layer which is formed from the foregoing coating composition. Also, in order to impart an antiglare function, the hard coat layer may have an irregular structure on the surface thereof.

As described above, the underlying layer may have other functional layer.

[Optical Film]

The optical film of the invention is an optical film comprising a transparent support having thereon an optical functional layer as an outermost surface, wherein the optical functional layer has a thickness of 50 nm or more and not more than 250 nm; the optical functional layer contains (A) a low refractive index fine particle having a refractive index of not more than 1.45 (B) a high refractive index fine particle having a refractive index of 1.55 or more and (C) a fluorine-containing compound; the low refractive index fine particle is arranged substantially in a line on the surface of the optical functional layer on the opposite side of the transparent support; and the high refractive index fine particle is maldistributed in a lower part of the optical functional layer on the side of the transparent support.

The optical film of the invention is hereunder described in more detail.

In the optical functional layer in the invention, it is preferable that a ratio of an average particle packing factor $P_{Lu}$ in the 30% thickness in an upper part of the optical functional layer on the opposite side of the transparent support to an average particle packing factor $P_{Lt}$ of the low refractive index fine particle A in the whole layer of the optical functional layer $[(P_{Lu}/P_{Lt})\times100]$ is 200% or more.

Also, it is preferable that a ratio of an average particle packing factor $P_{Hd}$ in the 50% thickness in a lower part of the optical functional layer on the side of the transparent support to an average particle packing factor $P_{Ht}$ of the high refractive index fine particle in the whole layer of the optical functional layer $[(P_{Hd}/P_{Ht})\times100]$ is 120% or more.

The arrangement of the low refractive index fine particle and the state of maldistribution of the high refractive index fine particle can be confirmed through observation of a cross section of the optical film by a transmission electron microscope (TEM). Also, the distribution of the low refractive index fine particle can be determined by a ratio of an average particle packing factor $P_{Lu}$ in the 30% thickness in an upper part of the optical functional layer on the opposite side of the transparent support to an average particle packing factor $P_{Lt}$ of the low refractive index fine particle in the whole layer of the optical functional layer $[(P_{Lu}/P_{Lt})\times100]$; and the distribution of the high refractive index fine particle can be determined by a ratio of an average particle packing factor $P_{Hd}$ in the 50% thickness in a lower part of the optical functional layer on the side of the transparent support to an average particle packing factor $P_{Ht}$ of the high refractive index fine particle in the whole layer of the optical functional layer $[(P_{Hd}/P_{Ht})\times100]$. In the invention, $P_{Lt}$, $P_{Lu}$, $P_{Ht}$ and $P_{Hd}$ were determined according to the following methods.

The optical film was sliced in a thickness of 50 nm, and its cross section was subjected to five-visual field photographing by a transmission electron microscope with a magnification of 150,000. The thickness of each of a portion where the high refractive index fine particle exists and a portion where the high refractive index fine particle does not exist is measured in 100 points over a width having a length of 50 times relative to the thickness of the optical functional layer, and an average value thereof is defined as a thickness of each of the high refractive index layer and the low refractive index layer.

Also, the number of the low refractive index fine particle in the width of the same length was counted, from which was then calculated $P_{Lt}$ as the particle number per unit area in the optical functional layer on the cross-sectional photograph. Also, the number of the low refractive index fine particle in the 30% thickness in an upper part of the optical functional layer was counted, from which was then calculated $P_{Lu}$ in the same manner. In the same method, the number of the high refractive index fine particle was counted, from which was then calculated $P_{Ht}$; and the particle number in the 50% thickness in a lower part of the optical functional layer was counted, from which was then calculated $P_{Hd}$.

For example, in the case where the low refractive index fine particle was partially observed in the 30% thickness in an upper part of the optical functional layer, the particle number was calculated by multiplying a proportion of an area of the particle contained in the subject region on the cross-sectional photograph; and in the case where the particle was observed superimposed, the superimposed portion was also counted as one. In that case, the in-layer distribution of the particle does not have directivity in a layer plane direction, and the average particle packing factor can be determined on the basis of the counted number of particles on a specified cross section selected as the slice.

In the invention, the $[(P_{Lu}/P_{Lt}) \times 100]$ is desirably 200% or more. When the $[(P_{Lu}/P_{Lt}) \times 100]$ is less than 200%, since the number of the low refractive index fine particle existing on the surface of the optical functional layer is too small) there is a possibility that the preferred effects of the invention are not obtained. The $[(P_{Lu}/P_{Lt}) \times 100]$ is more preferably 230% or more, and further preferably 270% or more.

Also, the $[(P_{Hd}/P_{Ht}) \times 100]$ is desirably 120% or more. When the $[(P_{Hd}/P_{Ht}) \times 100]$ is less than 120%, since a large amount of the high refractive index fine particle is distributed even in an upper part of the optical functional layer, and the reflectance increases, there is a possibility that the preferred effects of the invention are not obtained. The $[(P_{Hd}/P_{Ht}) \times 100]$ is more preferably 140% or more, and further preferably 160% or more.

[Configuration of Optical Film]

As described above, the optical film of the invention is an optical film including a transparent support having thereon the foregoing optical functional layer as an outermost surface. In addition to this optical functional layer, the subject optical film can have other functional layer as an underlying layer, if desired. Next, the layers configuring the optical film of the invention are described.

A preferred embodiment of the optical film of the invention is described.

Figure 4:
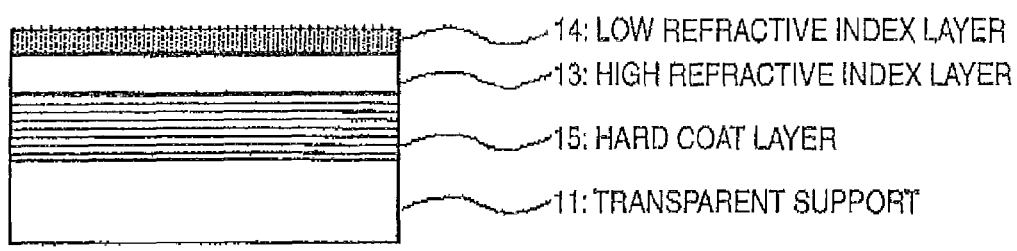
FIG. 4 is a cross-sectional view schematically showing a layer configuration of a two-layer type optical film as another exemplary embodiment of an optical film of the invention.

FIG. 4 is a cross-sectional view schematically showing a layer configuration of a two-layer type optical film having an excellent antireflection performance according to an embodiment of the invention. The optical film as shown in FIG. 4 has a layer 15 having hard coat properties (hereinafter referred to as "hard coat layer") as an underlying, layer on a transparent support 11 and has thereon an optical frictional layer 12 (a high refractive index layer 13 and a low refractive index layer 14 are described in FIG. 4 for the sake of convenience).

Figure 5:
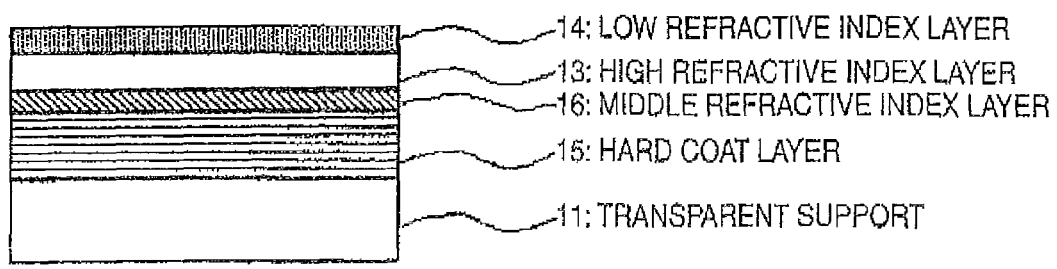
FIG. 5 is a cross-sectional view schematically showing a layer configuration of a multilayer type optical film as another exemplary embodiment of an optical film of the invention.

Also, FIG. 5 is a cross-sectional view schematically showing a layer configuration of a multilayer type optical film having a more excellent antireflection performance according to an embodiment of the invention. The optical film as shown in FIG. 5 has a transparent support 11, a layer 15 having hard coat properties (hereinafter referred to as "hard coat") as an underlying layer, a middle refractive index layer 16 and an optical functional layer 12 on the outermost surface. It is desirable that the transparent support 11 the middle reactive index layer 16 and the high refractive index layer 13 and the low refractive index layer 14 of the optical functional layer 12 have refractive indexes satisfying the following relationship.

(Refractive index of high refractive index layer)>(Refractive index of middle refractive index layer)>(Refractive index of transparent support)>(Refractive index of low refractive index layer)

[Transparent Support]

The support of the optical film of the invention is not particularly limited, and examples thereof include a transparent resin film, a transparent resin plate, a transparent resin sheet and a transparent glass. Examples of the transparent resin film include a cellulose acylate film (for example, a cellulose triacetate film (refractive index: 1.48), a cellulose diacetate film, a cellulose acetate butyrale film and a cellulose acetate propionate film), a polyethylene terephthalate film, a polyethersulfone film, a polyacrylic resin film, a polyurethane based film, a polyester film, a polycarbonate film, a polysulfone film, a polyether film, a polymethylpentene film, a polyether ketone film, a (meth)acrylonitrile film and a polymer having an alicyclic structure (for example, a norbornene based resin (for example, ARTON: a trade name of JSR Corporation) and an amorphous polyolefin (for example, ZEONEX: a trade name of Zeon Corporation)). A thickness of the support which can be used is usually from about 25 µm to 1,000 µm, preferably from 25 µm to 200 µm, more preferably from 30 µm to 150 µm, and further preferably from 30 to 90 µm.

Though a width of the support is arbitrary, in view of handling, yield and productivity, it is usually from 100 to 5,000 mm, preferably from 800 to 3,000 mm, and more preferably from 1,000 to 2,000 mm.

It is preferable that the surface of the support is smooth. A value of an average roughness Ra is preferably not more than 1 µm, more preferably from 0.0001 to 0.5 µm, and further preferably from 0.001 to 0.1 µm.

The transparent is preferably a plastic film. Examples of the plastic film include those made of a cellulose ester (for example, triacetyl cellulose, diacetyl cellulose, propionyl cellulose, butyryl cellulose, acetylpropionyl cellulose or nitrocellulose) or a polyolefin (for example, polypropylene, polyethylene or polymethylpentene). Of these, triacetyl cellulose and a polyolefin are preferable for the utility of a polarizing plate because they are small retardation and high optical uniformity; and when used for a liquid crystal display device, triacetyl cellulose is especially preferable.

[Hard Coat Layer]

In order to impart physical strength of the film, it is preferable that the optical film of the invention is provided with a hard coat layer on one surface of the transparent support.

The refractive index of the hard coat layer in the invention is preferably in the range of from 148 to 1.75, more preferably from 1.49 to 1.65, and further preferably from 1.50 to 1.55 from the standpoint of optical design for the purpose of obtaining an antireflection film. In the invention, it is preferable from the standpoints of reflectance, tint, unevenness and cost that the refractive index of the hard coat layer falls within this range.

As to a thickness of the hard coat layer the thickness of the hard coat layer is usually from about 0.5 µm to 50 µm, preferably from 1 µn to 30 µm, more preferably from 2 µm to 20 µm, and most preferably from 3 µm to 15 µm from the viewpoint of imparting sufficient durability and impact resistance to the films. It is preferable that the thickness of the hard coat layer falls within the foregoing range from the standpoints of curl, productivity and cost.

Also, the strength of the hard coat layer is preferably H or more, more preferably 2H or more, further preferably 3H or more, and most preferably 5H or more by a pencil hardness test.

Furthermore, it is preferable that an abrasion amount of a specimen before and after the test is small as far as possible in a taber test according to JIS K5400.

Also, a haze to be caused due to the surface scattering of the optical film of the invention (hereinafter referred to as "surface haze") is preferably from 0.3% to 20%, more preferably from 0.5% to 10%, further preferably from 0.5% to 5%, and especially preferably from 0.5% to 2%. When the surface haze is too large, the contrast in a bright room is deteriorated, whereas it is too small, the reflection is deteriorated.

Also, a haze to be caused due to the internal scattering of the optical film of the invention (hereinafter referred to as "internal haze") is preferably from 0% to 60%, more preferably from 1% to 40%, especially preferably from 10% to 35%), and most preferably from 15% to 30%. When the internal haze is too large, the frontal contrast is lowered, and a faded feel increases. When the internal haze is too small, a combination of raw materials which can be used is restricted, conformity with antiglare properties and other characteristic values becomes difficult, and the cost increases.

The haze of the hard coat layer varies depending upon the function to be imparted to the optical film.

In addition to the function to suppress the reflectance of the surface, in the case of imparting an antiglare function by surface scattering of the hard coat layer, a surface haze (a value obtained by subtracting a surface haze value from the total haze value; and the internal haze value can be measured by eliminating irregularities of the film surface by a substance having the same refractive index as in the film surface) is preferably from 0.1% to 20%, more preferably from 0.2% to 10%, further preferably from 0.2% to 5%, and especially preferably from 0.2% to 2%. When the surface haze is too large, the contrast in a bright room is deteriorated, whereas it is too small, the reflection is deteriorated.

Also, in the ease of incorporating a translucent particle in the hard coat layer to impart internal scattering, a preferred range of the internal haze varies depending upon the purpose. In the case of making it hard to view a pattern, color unevenness, brightness unevenness, glare, etc. of a liquid crystal panel by the internal scattering or imparting a function to enlarge a viewing angle by scattering, the internal haze value is preferably from 0% to 60%, more preferably from 1% to 40%, further preferably from 10% to 35%, and especially preferably from 15% to 30%. When the internal haze is too large, the frontal contrast is lowered, and a faded feel increases. When the internal haze is too small, a combination of raw materials which can be used is restricted, conformity with antiglare properties and other characteristic values becomes difficult, and the cost increases. On the other hand, in the case of attaching importance to the frontal contrast, the internal contrast is preferably from 0% to 30%, more preferably from 1% to 20%, and most preferably from 1% to 10%.

In the optical film of the invention, it is possible to freely set up the surface haze and internal haze depending upon the purpose.

Also, in the case of imparting an antiglare function by the surface scattering of the hard coat layer with respect to the surface irregular shape of the hard coat layer, it is preferred to regulate a center line average roughness (ea) to not more than 0.30 μm. Ra is more preferably 0.01 to 0.20 μm, and more preferably from 0.01 to 0.12 μm, When Ra is too large, there are involved problems that a white blur feel due to the surface scattering appears and uniformity of the layer to be formed on the hard coat layer is hardly obtained. In the film of the invention, the surface irregularities of the hard coat layer are dominant for the surface irregularities of the film. By regulating the center line average roughness of the hard coat layer, it is possible to make the center line average roughness of the optical film fall within the foregoing range. In order to imp at an antiglare function by the surface scattering, a particle having a particle size of from 1 μm to 50 μm may be added to the hard coat layer.

In addition to the regulation of the irregular shape of the surface, for the purpose of keeping the sharpness of an image, it is preferred to regulate the transmitted image sharpness. The transmitted image sharpness of the optical film is preferably 60% or more. In general the transmitted image sharpness is an index to show a blurring degree of an image reflected through the film, and it is meant that when this value is large, the image to be viewed through the film is sharp and good. The transmitted image sharpness is preferably 80% or more, and more preferably 90% or more.

[Middle Refractive Index Layer]

In the film of the invention, the antireflection properties can be enhanced by providing a middle refractive index layer. The refractive index of the middle refractive index layer is preferably 1.55 or more and not more than 1.80.

The middle refractive index layer which is used in the invention is composed of a binder (for example, ionizing radiation-curable polyfunctional monomers or polyfunctional oligomers) and a high reactive index inorganic fine particle for the purpose of controlling the refractive index. In the case of forming the middle refractive index layer in the invention, it is more preferable that the hard coat layer and the middle refractive index layer are formed by single coating. That is, it is preferred to form the hard coat layer and the middle refractive index layer by single winding up using a coater for simultaneous multilayer coating; and it is more preferred to simultaneously form the hard coat layer, the middle refractive index layer and the optical functional layer.

In a preferred embodiment of the invention, a coating composition containing the heat crosslinking or photo crosslinking fluorine-containing compound, the low refractive index fine particle (A), the high refractive index fine particle (B) and the curable compound is coated on the foregoing middle refractive index layer, thereby simultaneously forming the low refractive index layer and the high refractive index layer

[Transparent Conductive Layer]

In the optical film of the invention, for the antistatic prose, it is preferred from the standpoint of destaticization on the film surface to provide a transparent conductive layer. When it is required to decrease a surface resistivity value from the display side, the transparent conductive layer is effective in the case where contamination on the surface is of a problem. Examples of a method of forming a transparent conductive layer include known methods such as a method of coating a conductive coating solution containing a conductive particle and a reactive curable resin; and a method of forming a conductive thin film by vapor deposition or sputtering of a metal or metal oxide capable of forming a transparent film, etc. in the case of coatings the coating method is not particularly limited, and an optimum method is selected and performed among known methods such as roll coating, gravure coating, bar coating and extrusion coating depending upon the characteristics and coating amount of the coating solution. The transparent conductive layer can be formed on the transparent support or the hard coat layer directly or via a primer layer capable of strengthening adhesion thereto.

It is preferred that the surface resistance value (SR) of the conductive layer satisfies Log SR≦12.

The Log SR is more preferably from 5 to 12, further preferably from 5 to 9, and most preferably from 5 to 8. The surface resistivity (SR) of the conductive layer can be measured by a four probe method or a circular electrode method.

It is preferable that the conductive layer is substantially transparent. Specifically, the haze of the conductive layer is preferably not more than 10%, more preferably not more than 5%, further preferably not more than 3%, and most preferably not more than 1%. The transmittance of light having a wavelength of 550 nm is preferably 50% or more, more preferably 60% or more, further preferably 65% or more, and most preferably 70% or more,

[Step of Coating Optical Functional Layer]

The coating composition for forming an optical functional layer in the invention is one capable of forming an optical functional layer upon being cured. With respect to the subject coating composition, in the optical functional layer, the low refractive index fine particle is arranged substantially in a line on the surface of the optical functional layer on the opposite side of the transparent support; and the high refractive index fine particle is maldistributed in a lower part of the optical functional layer. Here, the matter that the high refractive index fine particle is maldistributed in a lower part of the optical functional layer means that the number of the high refractive index fine particles existing in a region within 50% on a near side to the support of the optical functional layer is 60% or more, preferably 70% or more, and more preferably 80% or more. The existing state of the high refractive index fine particles can be confirmed through observation of a slice of the optical film by TEM (scanning electron microscope). For example, the maldistribution state of the high refractive index fine particle may be confirmed by counting the number of fine particles existing within 50% on a near side to the support of the optical functional layer and the number of fine particles existing in the whole of the optical functional layer and comparing the both. In the case where the interface is not linear) a center line is drawn to form an interface. In the high refractive index layer, in the case where the existing proportion of high refractive index fine particles is low, a reduction of the reflectance of the optical film is small so that unevenness is easily generated.

The thickness of the optical functional layer of the invention is 50 nm or more and not more than 250 nm. It is more preferably in the range of from 100 to 230 nm, and further preferably in the range of from 50 to 220 nm. When the thickness of the optical functional layer is less than 50 nm, since it is difficult to form a uniform film, unevenness in the thickness is easily generated, and interference unevenness is easily generated. When the optical functional layer is thicker than 250 nm, the optical path length is long so that preferred antireflection properties are not obtained.

[Production Method of Optical Film]

Next, the production method of the optical film of the invention is described.

The production method of the optical film of the invention includes a step of coating at least one of a layer-forming composition for hard coat layer and a layer-forming composition for middle refractive index layer on a transparent support, as the need arises; and a step of coating a coating composition for forming an optical functional layer which is an essential layer. Preferred examples of the coating composition for forming an optical functional layer are the same as those described previously. It is especially preferable that the method does not go through a step of winding up the transparent support coated between the two steps.

The step of coating at least either one of the hard coat layer and the middle refractive index layer is preferably a step of extrusion onto the support using a slot die or a step of simultaneous extrusion onto the support from a coater having two slots.

Also, it is preferable that after the step of coating at least either one of the hard coat layer and the middle refractive index layer and the step of coating the optical functional layer, a step of drying and a step of curing are carried out at least one time.

In the case where plural functional layers are formed in addition to the optical functional layer, it is possible to form every layer for the respective layers by carrying out sending, layer formation and winding up in the necessary layer number. However, it is advantageous in view of productivity and cost to form all of the layers in a single step by providing a set of a coating station and a drying and curing zone in the same number as the number of layers in parallel during the stage of from sending of the transparent support to winding up.

In the optical film of the invention, since the optical functional layer is formed by single coating, in comparison with a production method of forming the high refractive index layer and the low refractive index layer in a separate step from each others the number of the set of a coating station and a drying and curing zone can be reduced by one, and a large merit is obtained from the standpoint of equipment. For example, in the case of forming four layers of the hard coat layer, the middle refractive index layer, the high refractive index layer and the low refractive index layer on the transparent support, when the technology of the invention is adopted, the hard coat layer and the middle refractive index layer can be formed on the transparent support, and the optical functional layer can be further formed; it is enough to arrange three sets of a coating station and a crying and curing zone during the stage of from sending of the transparent support to winding up, thereby bringing effects in view of productivity and costs. Also, by adopting a technology for simultaneously forming the hard coat layer and the middle refractive index layer, it is enough to arrange two sets of a coating station and a drying and curing zone during the stage of from sending of the transparent support to winding up, thereby bringing a very significant effect.

The respective steps are hereunder described in greater detail.

In coating step, it is more preferred to perform coating using a slot die having plural slots. For example, by using a slot die having two slots and simultaneously extruding a coating composition for the optical functional layer and a coating composition for simultaneously forming the hard coat layer and the middle refractive index layer onto the transparent support from the separate slots, these layers can be simultaneously formed. Even by using a coating machine having only one set of a coating station and a drying and curing zone, an optical film can be obtained by single coating, thereby bringing a more significant effect.

The optical functional layer and the functional layer in the optical film of the invention can be formed in the following coating method, but it should not be construed that the invention is limited to this method.

There are adopted known methods such as a dip coating method, an air knife coating method, a curtain coating method, a roller coating method, a wire bar coating method, a gravure coating method, an extrusion coating method (die coating method) (see U.S. Pat. No. 2,681,294) and a microgravure coating method. Of these, a microgravure, coating method and a die coating method are preferable; and a die coating method is especially preferable.

The "microgravure coating method" as referred to herein) which is adopted in the invention, is a coating method which is characterized by disposing a gravure roll having a diameter of from about 10 to 100 mm, and preferably from about 20 to 50 mm and engraved with a gravure pattern over the entire periphery thereof beneath the support and simultaneously revolving the gravure roll in an inverse direction to the conveyance direction of the support and scraping away the excessive coating solution from the surface of the subject gravure roll by a doctor blade and transferring a fixed amount of the coating solution onto a lower surface of the support in a position at which the upper surface of the support is in a fee state, thereby achieving coating.

[Extrusion Step onto Support Using a Slot Die]

In order to teed the film of the invention with high productivity, an extrusion method (die coating method) is preferably adopted.

In particular, with respect to a die coater which can be preferably used in a region where the wet coating amount is low (not more than 20 cc/m$^2$), such as the hard coat layer and the antireflection layer, JP-A-2007-293313 can be made hereof by reference.

In the invention, in a process for coating the coating composition on the support and drying it, the coating composition capable of spontaneously segregating the low refractive index fine particle in the coating composition on the uppermost surface side and spontaneously segregating the high refractive index fine particle in the coating composition on the interface side of the support side, respectively is formed, whereby the object is attained. For the purpose of more effectively segregating the added low refractive index fine particle and high refractive index fine particle on the respective surface sides, it is also possible to divide the component which is maldistributed on the surface side and the component which is segregated on the interface side of the support side from each other and to stack and coat the respective compositions simultaneously or substantially simultaneously by a coating device having two coating heads (for example, see FIGS. 6A and 6B of JP-A-2007-293313) or the like. In that case, since coating is carried out by previously dividing the coating composition into two liquids, it is easy to carry out the segregation, and as a result, a cohesion defect of the particle in a fine region, or the like is reduced. Thus, not only an enhancement of the antireflection performance or scratch resistance can be expected, but even in the case of a large area, a layer which is stable and free from unevenness can be formed.

That is, a method including coating, on a transparent support, a curable composition 1 containing a low refractive index fine particle having a refractive index of not more than 1.45 and a fluorine-containing compound and a curable composition 2 containing a high refractive index fine particle having a refractive index of 1.55 or more using a coating device including at least member selected from adjacent two slot dies and a slide-type coating head while supporting the transparent support by backup rollers and travelling it, and curing the curable compositions 1 and 2 to form an optical functional layer having a thickness of 50 nm or more and not more than 250 nm is also preferable as the method for producing the optical film of the invention.

[Protective Film for Polarizing Plate]

In the case of using the optical film of the invention for a liquid crystal display device, in preparing a polarizing plate, the optical film is used as a surface protective film for polarizing film (protective film for polarizing plate). Accordingly, it is preferred to improve the adhesion to the polarizing film containing polyvinyl alcohol as a major component by hydrophilizing the surface of the transparent support on the opposite side to the side having the optical functional layer, namely the surface on the side to which the polarizing film is stuck.

It is especially preferred to use a triacetyl cellulose film as the transparent support. As the method of preparing a protective film for polarizing plate in the invention, there may be considered two methods including (1) a method in which each layer (for example, the hard coat layer, the middle refractive index layer, the optical functional layer; etc.) is coated on one surface of the transparent support having been previously subjected to a saponification treatment; and (2) a method in which after coating each of the foregoing layers on one surface of the transparent support, the side to which the polarizing film is stuck is subjected to a saponification treatment. However, in the method (1), since even the surface on which a hard coal layer is to be coated is hydrophilized, it is difficult to ensure the adhesion between the support and the hard coat layer. Therefore, the method (2) is preferable.

[Saponification Treatment]

(1) Dipping Method:

This method is a measure in which the optical film is dipped in an alkaline solution, thereby saponifying all of the surfaces having reactivity with an alkali on the entire surface of the film. Since this method does not require special equipment, it is preferable from the viewpoint of cost. A sodium hydroxide aqueous solution is preferable as the alkaline solution. A concentration of the alkaline solution is preferably from 0.5 to 3 moles/L, and especially preferably from 1 to 2 moles/L; and a liquid temperature of the alkaline solution is preferably from 30 to 70° C., and especially preferably from 40 to 60° C.

Though the foregoing combination of the saponification condition is a combination of relatively mild conditions, it can be set up by the raw materials and configuration of the optical film and a desired contact angle.

After dipping in the alkaline solution, it is preferable that the film is thoroughly swashed with water or that the film is dipped in a dilute acid, thereby neutralizing an alkaline component such that the alkaline component does not remain in the film.

By the saponification treatment, the surface of the transparent support opposite to the surface on which the optical functional layer is provided is hydrophilized. The protective film for polarizing plate is provided for use after making the hydrophilized surface of the transparent support adhere to the polarizing film.

The hydrophlized surface is effective for improving the adhesion to the adhesive surface made of as a major component, polyvinyl alcohol.

With respect to the saponification treatment, it is preferable from the viewpoint of adhesion to the polarizing film that the contact angle of the surface of the transparent support in the opposite side to the side at which the optical functional layer is provided against water is low as far as possible. On the other hand, in the dipping method since even the surface having the optical functional layer thereon is damaged by the alkali at the same time over, it is important to adopt a necessary and minimum reaction condition. In the case where the contact angle of the transparent support on the surface in the opposite side to the side at which the optical functional layer is provided, namely the sticking surface of the optical film, against water is employed as an index of the damage which the antireflection layer receives by the alkali, especially when the transparent support is triacetyl cellulose, the contact angle is preferably from 20° to 50°, more preferably from 30° to 50°, and further preferably from 40° to 50°. When the contact angle is not more than 50°, a problem of adhesion to the polarizing, film is not caused, and therefore, such is preferable. On the other hand, when the contact angle is 20° or more, the damage which the optical functional layer receives is not large, the physical strength and light fastness are not hindered, and therefore, such is preferable.

(2) Method of Coating an Alkaline Solution:

As a measure for avoiding the damage against the optical functional layer in the foregoing dipping method, there is preferably adopted a method of coating an alkaline solution by coating an alkaline solution only on the surface on the opposite side to the surface on which the optical functional layer is provided, followed by heating, washing with water and drying. In that case, the "coating" as referred to herein means that the alkaline solution or the like is brought into contact with only the surface on which the saponification is carried out. At that time, it is preferred to carry out the saponification treatment such that the contact angle of the sticking surface of the optical film against water is from 10° to 50°. Also, in addition to the coating, spraying, contacting with a liquid-containing belt, or other means is also included. By adopting such a method, since equipment and step for coating the alkaline solution are separately required, this method is inferior to the dipping method (1) from the viewpoint of cost. On the other hand, since the alkaline solution conies into contact with only the surface to which the saponification treatment is applied, a layer using a raw material which is weak against the alkaline solution can be provided on the surface on the opposite side. For example, in a vapor deposited film or a sol-gel film, a variety of influences such as corrosion, dissolution and peeling are caused due to the alkaline solution. Accordingly, though it is not desired to provide such a vapor deposited film or sol-gel film by the dipping method, since the film does not come into contact with the solution in this coating method, it is possible to use such a vapor deposited film or a so-gel film without any problem.

In all of the foregoing saponification methods (1) and (2), since the saponification can be carried out after winding out the film from the support in a rolled state and forming the respective layers, it may be added after the optical film production step and achieved in a series of operations. Furthermore, by continuously carrying out a sticking step to a polarizing plate made of a similarly wound out support collectively, it is possible to prepare a polarizing plate with good efficiency as compared with the case of carrying out the same operations sheet by sheet.

[Antireflection Film]

Since the optical film of the invention is excellent in the antireflection performance, it can be used as an antireflection film. The subject antireflection film can also be used as a protective film for polarizing plate, or the like.

[Polarizing Plate]

The polarizing plate of the invention is a polarizing plate having a polarizing film and two protective films for protecting the both surfaces on the front and back sides of the subject polarizing film. At least one of the protective films is the foregoing optical film of the invention.

The transparent support and the polarizing film can be adhered to each other via an adhesive layer or a pressure sensitive adhesive layer made of polyvinyl alcohol.

By using the optical film of the invention as a protective film for polarizing plate, a polarizing plate having physical strength and an excellent antireflection function can be prepared and it is possible to largely reduce the cost.

Also, by preparing a polarizing plate using the optical film of the invention for one of the protective films for polarizing plate and an optically-compensatory film having optical anisotropy as described later for the other protective film of the polarizing film, respectively, it is possible to prepare a polarizing plate having improved contrast of a liquid crystal display device in a bright room and capable of extremely widening a viewing angle in the up and down, left and right directions and the oblique direction.

[Optically-Compensatory Film]

An optically-compensatory film (retardation film) is able to improve a viewing angle characteristic of a liquid crystal display screen.

Known optically-compensatory films can be used as the optically-compensatory film. An optically-compensatory film having a layer having optical anisotropy and containing a compound having a discotic structural unit and characterized in that an angle formed by the subject discotic compound and the support varies following a distance from the transparent support, as described in IP-A-2001-100042, is preferable from the standpoint of widening a viewing angle.

It is preferable that the subject angle increases with an increase of the distance of the optically-anisotropic layer from the side of the support surface.

In the case of using the optically-compensatory film as a protective film for polarizing film, it is preferable that the surface on the side to which the polarizing film is to be stuck is subjected to a saponification treatment. It is preferable that this saponification is carried out according to the foregoing saponification treatment.

Also, an embodiment in which the optically-anisotropic layer further contains a cellulose ester; an embodiment in which an oriented film is provided between the optically-anisotropic layer and the transparent support; and an embodiment in which the transparent support of the optically-compensatory film having the optically-anisotropic layer has optically-negative uniaxiality, has an optical axis in a normal direction of the transparent support surface and further satisfies the following condition are also preferable.

$$20 \leq \{(nx+ny)/2-nz\} \times d \leq 400$$

In the foregoing conditional expressions, nx represents a refractive index of a slow axis direction in the film plane (a direction where the refractive index is maximum); ny represents a refractive index in a fast axis direction (a direction where the refractive index is minimum); nz represents a refractive index in a thickness direction of the film; and d represents a thickness of the optically-compensatory layer.

[Image Display Device]

The image display device of the invention has at least one of the optical film of the invention and the polarizing plate of the invention.

Examples of the image display device having the optical film of the invention include a liquid crystal display device (LCD), a plasma display panel (PDP), an electroluminescence display device (OLED), a cathode ray tube display device (CRT), a field emission display (FED) and a surface-conduction electron-emitter display (SED). Examples of the image display device having a polarizing plate having the optical film of the invention include image display devices such as a liquid crystal display device (LCD) and an electroluminescence display device (OLED). The image display device of the invention is used by adhering the polarizing plate having the optical film of the invention to a glass of a liquid crystal cell of the image display device directly or via other layer.

The polarizing plate using the optical film which is used in the invention can be preferably used for transmission type, reflection type or semi-transmission type liquid crystal display devices of a twisted nematic (TN) mode, a super twisted nematic (STN) mode, a vertical alignment (VA) mode, an in-plane switching (IPS) mode, an optically-compensatory bend cell (OCB) mode, or the like.

Also, when used for a transmission type or semi-transmission type liquid crystal display device, a display device having higher visibility can be obtained using a commercially available brightness enhancing film (a polarizing separation film having a polarizing selective layer; for example, D-BEF, manufactured by Strumitomo 3M Limited, etc.) in combination.

Also, a combination with a λ/4 plate can be used for reducing reflected light from the surface and the inside as a polarizing plate for reflection type liquid crystal or a surface protective plate for OLED.

EXAMPLES

In order to explain the invention in detail, the invention is hereunder described with reference to the following Examples, but it should not be construed that the invention is limited thereto. All "parts" and "%" are on a mass basis unless otherwise indicated.
(Synthesis of Perfluoroolefin Copolymer (P1))
Perfluoroolefin Copolymer (P1)

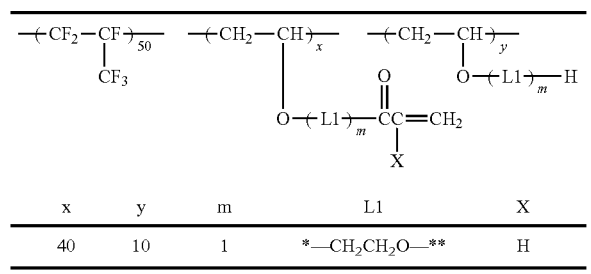

| x | y | m | L1 | X |
|---|---|---|---|---|
| 40 | 10 | 1 | *—CH$_2$CH$_2$O—** | H |

In a stainless steel-made stirrer autoclave having an internal volume of 1100 mL, 40 mL of ethyl acetate 14.7 g of hydroxyethyl vinyl ether and 0.55 g of dilauroyl peroxide were charged, and the system was deaerated and purged with a nitrogen gas, 25 g of hexafluoropropylene (REP) was further introduced into the autoclave, and the temperature was raised to 65° C. A pressure at a point of time when the temperature in the autoclave reached 65° C. was 0.53 MPa (5.4 kg/cm$^2$). The reaction was continued for 8 hours while keeping the subject temperature, and at a point of time when the pressure reached 0.31 MPa (32 kg/cm$^2$), heating was stopped, and the system was allowed to stand for cooling. At a point of time when the inner temperature decreased to room temperature, the unreacted monomers were expelled, the autoclave was opened, and the reaction solution was taken out. The obtained reaction solution was thrown into an excess of hexane, and a polymer precipitated by decantation for removal of the solvent was taken out. Furthermore, this polymer was dissolved in a small amount of ethyl acetate, and the solution was subjected to reprecipitation from hexane twice, thereby completely removing the residual monomers. After drying, 28 g of a polymer was obtained. Subsequently, 20 g of the subject polymer was dissolved in 100 mL of N,N-dimethylacetamide, 10.3 g of acrylyl chloride was added dropwise under ice cooling, and the mixture was then stirred at room temperature for 10 hours. Ethyl acetate was added to the reaction solution; the mixture was washed with water, an organic layer was extracted and then concentrated; and the obtained polymer was reprecipitated from hexane to obtain 19 g of a perfluoroolefin copolymer (P1). The obtained polymer had a refractive index of 1.421.

(Preparation of Sol Solution a)

In a reactor equipped with a stirrer and a reflux condenser, 120 parts of methyl ethyl ketone (MEK), 100 parts of acryloyloxypropyltrimethoxysilane (KBM-5103, manufactured by Shin-Etsu Chemical Co., Ltd.) and 3 parts of diisopropoxyaluminum ethyl acetoacetate were added and mixed. After adding 30 parts of ion exchanged water, the mixture was allowed to react at 60° C. for 4 tours, and the reaction mixture was cooled to room temperature to obtain a sol solution a. The sol solution a had a mass average molecular weight of 1,600, and among components including oligomer or polymer components, components having a molecular weight of from 1,000 to 20,000 accounted for 100%. Furthermore, as a result of gas chromatographic analysis, the raw material acryloyloxypropyltrimethoxysilane did not remain at all.
(Preparation of Silica Dispersion a)

To 500 parts of a hollow silica fine particle sol (a silica sol in isopropyl alcohol, average particle size: 40 nm, shell thickness: 6 mm silica concentration: 20% by mass, refractive index of silica particle: 1.30; as prepared by changing the size in conformity to Preparation Example 4 of JP-A-2002-79616), 10 parts of acryloyloxypropyltrimethoxysilane (manufactured by Shin-Etsu Chemical Co., Ltd.) and 1.5 parts of diisopropoxyaluminum ethyl acetate were added and mixed, to which was then added 9 parts of ion exchanged water. After allowing the mixture to react at 60° C. for 8 hours, the reaction mixture was cooled to room temperature, to which was then added 1.8 parts of acetyl acetone.

Solvent substitution was carried out by distillation in vacuo under a pressure of 20 kPa while adding cyclohexanone to 500 g of this dispersion such that the content of silica became substantially constant. The dispersion was free form the generation of a foreign substance. When the solids concentration was regulated with cyclohexanone to 22% by mass, the viscosity was found to be 9 mPa·s at 25° C. The residual amount of isopropyl alcohol in the obtained silica dispersion A was analyzed by gas chromatography. As a result, it was found to be 1.0%,
(Preparation of Silica Dispersion B): Silica Sol Modified with Fluorine-Containing Modifier To 500 parts of a hollow silica fine particle sol (a silica sol in isopropyl alcohol, average particle size: 40 nm, shell thickness: 6 nm, silica concentration: 20% by mass, refractive index of silica particle: 1.30, as prepared by changing the size in conformity to Preparation Example 4 of JP-A-2002-79616), 8 parts of acryloyloxypropyltrimethoxysilane (manufactured by Shin-Etsu Chemical Co., Ltd.), 2 parts of tridecafluorooctyltrimethoxysilane (manufactured by GE Toshiba Silicone Co., Ltd.) and 1.5 parts of diisopropoxyaluminum ethyl acetate were added and mixed, to which was then added 9 parts of ion exchanged water. After allowing the mixture to react at 60° C. for 8 hours, the reaction mixture was cooled to room temperature, to which was then added 1.8 g of acetyl acetone.

Solvent substitution was carried out by distillation in vacuo under a pressure of 20 kPa while adding cyclohexanone to 500 g of this dispersion such that the content of silica became substantially constant. The dispersion was free from the generation of a foreign substance. When the solids concentration was regulated with cyclohexanone at 22% by mass, the viscosity was found to be 9 mPa·s at 25° C. The residual amount of isopropyl alcohol in the obtained silica dispersion B was analyzed by gas chromatography. As a result, it was found to be 1.0%.
(Preparation of Dispersion C)

To 500 g of a methyl isobutyl ketone dispersion of a ZrO$_2$ particle having an average particle size of 15 nm (refractive index of ZrO$_2$ particle: 2.4, solids concentration 20% by mass), 10 g of acryloyloxypropyltrimethoxysilane (manufactured by Shin-Etsu Chemical Co., Ltd.) and 0.5 parts of diisopropoxyaluminum ethyl acetate were added and mixed, to which was then added 3 g of ion exchanged water. After allowing the mixture to react at 60° C. for 8 hours, the reaction mixture was cooled to room temperature, to which was then added 1.8 g of acetyl acetone) thereby preparing a dispersion C, 31.4 g of a mixture of dipentaerythirtol pentaacrylate and dipentaerythritol hexaacrylate (DPHA, manufactured by Nippon Kayaku Co., Ltd.) was added to the dispersion C, and the mixture was distilled in vacuo under a pressure of 20 kPa to prepare a solution having a solids concentration of 62%, 0.5 g of a photopolymerization initiator (IRGACURE 184, manufactured by Ciba Japan K.K.) and 0.5 g of a photopolymerization initiator (IRGACURE 904, manufactured by Ciba Japan K.K.) were added, and the mixture was stirred for dissolution. The concentration was regulated by the addition of methyl ethyl ketone, thereby preparing a dispersion C having a solids concentration of about 61% and a ZrO$_2$ content in the solid of about 70%.

(Preparation of Coating Solution A for Hard Coat Layer)

306 parts by mass of a mixture of dipentaerythritol pentaacrylate and dipentaerythritol hexaacrylate (DPHA, manufactured by Nippon Kayaku Co., Ltd.) was dissolved in a mixed solvent of 16 parts by mass of methyl ethyl ketone and 220 parts by mass of cyclohexanone. To the obtained solution, 7.5 parts by mass of a photopolymerization initiator (IRGACURE 184, manufactured by Ciba Japan K.K.) was added, and the mixture was stirred until it was dissolved. Thereafter, 450 parts by mass of MEK-ST (a methyl ethyl ketone dispersion of an SiO$_2$ sol having an average particle size of from 10 to 20 nm and a solids concentration of 30% by mass, manufactured by Nissan Chemical Industries, Ltd.) was added, and the mixture was stirred. The resulting mixture was filtered through a polypropylene-made filter (PPE-03) having a pore size of 3 μm, thereby preparing a coating solution A for hard coat layer. A coating film obtained by coating this solution and curing with ultraviolet rays had a refractive index of 1.50.

(Preparation of Coating Solution B for Hard Coat Layer)

71.2 g of a mixture of dipentaerythritol triacrylate and pentaerythritol tetraacrylate (PET-30, manufactured by Nippon Kayaku Co., Ltd.), 2.9 g of a polymerization initiator (IRGACURE 184, manufactured by Ciba Japan K. K.), 0.1 g of a fluorine based surface modifier (SP-13) and 11.8 g of a silane coupling agent (KBM-5103, manufactured by Shin-Etsu Chemical Co., Ltd.) were added in methyl isobutyl ketone (MIBK), and the mixture was stirred for 60 minutes by an air disper, thereby completely dissolving the solutes. A coating film obtained by coating this solution and curing with ultraviolet rays had a refractive index of 1.52. 13.7 g of a crosslinked poly(acryl-styrene) particle having an average particle size of 3.5 μm (copolymerization composition ratio: 50/50, refractive index: 1.536) was dispersed by a Polyton dispersing machine at 10,000 rpm for 20 minutes, and the obtained dispersion was added as a 30% methyl isobutyl ketone dispersion. Methyl isobutyl ketone and methyl ethyl ketone were then added to regulate the solids Concentration to 45% by mass. Thereafter, the mixture was stirred for 10 minutes by an air disper. A ratio of methyl isobutyl ketone to methyl ethyl ketone was regulated to 9/1.

The foregoing mixed solution was filtered through a polypropylene-made filter having a pore size of 30 μm, thereby preparing a coating solution B for hard coat layer.

SP-13: Fluorine based surfactant (used after dissolving as a 10% by mass solution in MEK)

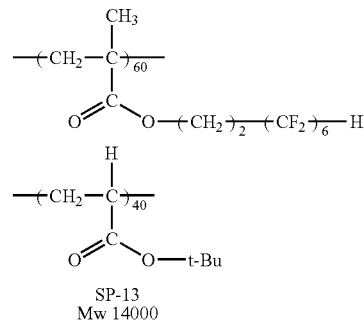

SP-13
Mw 14000

(Preparation of Coating Solution A for Middle Refractive Index Layer)

To 65.5 g of the dispersion C, 57 g of a mixture of dipentaerythritol pentaacrylate and dipentaerythritol hexaacrylate (DPHA, manufactured by Nippon Kayaku Co., Ltd.) and 3 g of a photopolymerization initiator (IRGACURE 904, manufactured by Ciba Japan K.K.); methyl isobutyl ketone was added such that the solids concentration was 3.5% by mass, and the mixture was stirred for 10 minutes. A coating film obtained by coating this solution and curing with ultraviolet rays had a refractive index of 1.62.

The mixed solution was filtered through a polypropylene-made filter (PPE-03) having a pore size of 3 μm, thereby preparing a coating solution A for middle refractive index layer.

(Preparation of Coating Solution B for Middle Refractive Index Layer)

To 20.0 parts of a commercially available conductive fine particle ATO (antimony-doped tin oxide T-1) (specific surface area: 80 m$^2$/g, manufactured by Mitsubishi Materials Corporation), 6.0 parts of the following dispersant (B-1) having an anionic group and a methacryloyl group and 74 parts of methyl isobutyl ketone were added, and the mixture was stirred.

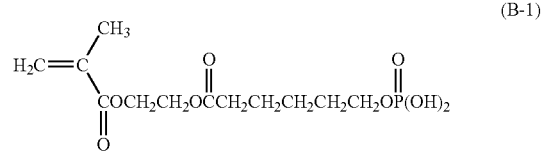

Mw = 324

The ATO particle in the foregoing solution was dispersed using a media dispersion machine (using zirconia beads having a diameter of 0.1 mm). The mass average particle size of the ATO particle in the dispersion was evaluated by a light scattering method. As a result, it was found to be 55 nm. There was thus prepared an ATO dispersion.

To 100 parts of the foregoing ATO dispersion, 6 parts of a mixture of dipentaerythritol pentaacrylate and dipentaerythritol hexaacrylate (DPHA, manufactured by Nippon Kayaku Co., Ltd.) and 0.8 parts of a polymerization initiator (IRGACURE-184, manufactured by Ciba Japan K.K.) were added, and the mixture was stirred. There, was thus prepared a coating solution B for middle refractive index layer. A coating film obtained from this paint had a refractive index of 1.62.

(Preparation of Coating Solution A for Optical Functional Layer)

To 132 g of the dispersion C, 31.5 g of the perfluoroolefin copolymer (P1), 81.8 g of the silica dispersion A, 1.6 g of reactive silicone X-22-164B (a trade name of Shin-Etsu Chemical Co., Ltd.), 7.2 g of the sol solution a and 1.6 g of a photopolymerization initiator (IRGACURE 907 (a trade name), manufactured by Ciba Japan K.K.); methyl ethyl ketone and cyclohexanone were added such that the solids concentration was 5.4%; and the mixture was stirred for 10 minutes. A mass ratio of methyl ethyl ketone to cyclohexanone was regulated to 8/2.

The mixed solution was filtered through a polypropylene-made filter (PPE-03) having a pore size of 3 μm, thereby preparing a coating Solution A for optical functional layer.

(Preparation of Coating Solution B for Optical Functional Layer)

To 132 g of the dispersion C, 28.7 g of the perfluoroolefin copolymer (P1), 94.4 g of the silica dispersion A, 1.6 g of reactive silicone X-22-164B (a trade name of Shin-Etsu Chemical Co., Ltd.), 7.2 g of the sol solution a and 1.6 g of a photopolymerization initiator (IRGACURE 907 (a trade name), manufactured by Ciba Japan K.K.); methyl ethyl ketone and cyclohexanone were added such that the solids concentration was 5.4%; and the mixture was stirred for 10 minutes. A mass ratio of methyl ethyl ketone to cyclohexanone was regulated to 8/2.

The mixed solution was filtered through a polypropylene-made filter (PPE-03) having a pore size of 3 μm, thereby preparing a coating solution B for optical functional layer.

(Preparation of Coating Solution C for Optical Functional Layer)

To 132 g of the dispersion C, 19.0 of the perfluoroolefin copolymer (P1), 138.4 g of the silica dispersion A, 1.6 g of reactive silicone X-22-164B (a trade name of Shin-Etsu Chemical Co., Ltd.), 7.2 g of the sol solution a and 1.6 g of a photopolymerization initiator (IRGACURE 907 (a trade name), manufactured by Ciba Japan K.K.); methyl ethyl ketone and cyclohexanone were added such that the solids concentration was 5.4%; and the mixture was stirred for 10 minutes. A mass ratio of methyl ethyl ketone to cyclohexanone was regulated to 8/2.

The mixed solution was filtered through a polypropylene-made filter (PPE-03) having a pore size of 3 μm, thereby preparing a coating solution C for optical functional layer.

(Preparation of Coating Solution D for Optical Functional Layer)

To 132 g of the dispersion C, 31.5 g of the perfluoroolefin copolymer (P1), 11.1 g of a mixture of dipentaerythritol pentaacrylate and dipentaerythritol hexaacrylate (DPHA, manufactured by Nippon Kayaku Con, Ltd.), 31.5 g of the silica dispersion A, 1.6 g of reactive silicone X-22-164B (a trade name of Shin-Etsu Chemical Co., Ltd.), 7.2 g of the sol solution a and 1.6 g of a photopolymerization initiator (IRGACURE 907 (a trade name), manufactured by Ciba Japan K.K.); methyl ethyl ketone and cyclohexanone were added such that the solids concentration was 5.4%; and the mixture was stirred for 10 minutes. A mass ratio of methyl ethyl ketone to cyclohexanone was regulated to 8/2.

The mixed solution was filtered through a polypropylene-made filter (PPE-03) having a pore size of 3 μm, thereby preparing a coating solution D for optical functional layer.

(Preparation of Coating Solution E for Optical Functional Layer)

To 132 g of the dispersion C, 31.5 g of the perfluoroolefin copolymer (P1), 152 g of a mixture of dipentaerythritol pentaacrylate and dipentaerythritol hexaacrylate (DPHA, manufactured by Nippon Kayaku Co., Ltd), 12.6 g of the silica dispersion A, 1.6 g of reactive silicone X-22-1643 (a trade name of Shin-Etsu Chemical Co., Ltd.), 7.2 g of the sol solution a and 1.6 g of a photopolymerization initiator (IRGACURE 907 (a trade name), manufactured by Ciba Japan K.K.); methyl ethyl ketone and cyclohexanone were added such that the solids concentration was 5.4%; and the mixture was stirred for 10 minutes. A mass ratio of methyl ethyl ketone to cyclohexanone was regulated to 8/2.

The mixed solution was filtered through a polypropylene-made filter (PPE-03) having a pore size of 3 μm, thereby preparing a coating solution E for optical functional layer.

(Preparation of Coating Solution F for Optical Functional Layer)

A coating solution F for optical functional layer was prepared in the same manner as in the coating solution A for optical functional layer, except for replacing die silica dispersion A with 18.8 g of a mixture of dipentaerythritol pentaacrylate and dipentaerythritol hexaacrylate (DPHA, manufactured by Nippon Kayaku Co., Ltd.).

(Preparation of Coating Solution G for Optical Functional Layer)

A coating solution G for optical functional layer was prepared in the same manner as in the coating solution A for optical functional layer, except for replacing the silica dispersion A with 90.0 g of a hollow silica fine particle sol (a silica sol in isopropyl alcohol, average particle size: 40 nm, shell thickness: 6 nm, silica concentration; 20% by mass, refractive index of silica particle: 1.30).

(Preparation of Coating Solution H for Optical Functional Layer)

A coating solution H for optical functional layer was prepared in the same manner as in the coating solution A for optical functional layer, except for replacing the silica dispersion A with the same amount of the silica dispersion B.

(Preparation of Coating Solution I for Optical Functional Layer)

A coating solution I for optical functional layer was prepared in the same manner as in the coating solution A for optical functional layer, except for replacing the dispersion C with 80.5 g of a mixture of dipentaerythritol pentaacrylate and dipentaerythritol hexaacrylate (DPHA, manufactured by Nippon Kayaku Co, Ltd.).

(Preparation of Coating Solution J for Optical Functional Layer)

A coating solution J for optical functional layer was prepared in the same manner as in the coating solution A for optical functional layer, except for replacing the perfluoroolefin copolymer (P1) with the same amount of a mixture of dipentaerythritol pentaacrylate and dipentaerythritol hexaacrylate (DPHA, manufactured by Nippon Kayaku Co., Ltd.).

(Preparation of Coating Solution K for Optical Functional Layer)

31.5 g of the perfluoroolefin copolymer (P1), 12.6 g of the silica dispersion A, 0.8 g of reactive silicone X-22-164B (a trade name of Shin-Etsu Chemical Co., Ltd.), 3.6 g of the sol solution a and 0.8 g of a photopolymerization initiator (IRGACURE 907 (a trade name), manufactured by Ciba Japan K.K.) were added; methyl ethyl ketone and cyclohexanone were added such that the solids concentration was 3.6%; and the mixture was stirred for 10 minutes. A mass ratio of methyl ethyl ketone to cyclohexanone was regulated to 8/2.

The mixed solution was filtered through a polypropylene-made filter (PPE-03) having a pore size of 3 μm, thereby preparing a coating solution K for optical functional layer.

(Preparation of Coating Solution L for Optical Functional Layer)

To 132 g of the dispersion C, 11.1 g of a mixture of dipentaerythritol pentaacrylate and dipentaerythritol hexaacrylate (DPHA, manufactured by Nippon Kayaku Co., Ltd.), 0.8 g of reactive silicone X-22-164B (a trade name of Shin-Etsu Chemical Co., Ltd.), 3.6 g of the sol solution a and 0.8 g of a photopolymerization initiator (IRGACURE 907 (a trade name), manufactured by Ciba Japan K.K.) were added; methyl ethyl ketone and cyclohexanone were added such that the solids concentration was 5.4%; and the mixture was stirred for 10 minutes. A mass ratio of methyl ethyl ketone to cyclohexanone was regulated to 8/2.

The mixed solution was filtered through a polypropylene-made filter (PPE-03) having a pore size of 3 µm, thereby preparing a coating solution L for optical functional layer.

Example 1

(Preparation of Optical Film)
(Preparation of Optical Film 1-1A)

The foregoing coating solution A for hard coat layer was coated on a triacetyl cellulose film having a thickness of 80 µm (TAC-TA80U, manufactured by FUJIFILM Corporation; refractive index: 1.49) using a slot die coater (the coater as shown in FIG. 3(A) of JP-A-2007-293313) and dried at 100° C. for 2 minutes. Subsequently, purge with nitrogen was carried out, and ultraviolet rays were irradiated at 70 mJ/cm$^2$ under a condition in an oxygen concentration of 0.1% to cure the coated layer, thereby forming a hard coat layer (refractive index: 1.50, thickness: 6 µm). Subsequently, the foregoing coating composition A for middle refractive index layer was coated using a slot die coater (the coater as shown in FIG. 3(A) of JP-A-2007-293313) and dried at 100° C. Thereafter, purge with nitrogen was carried out, and ultraviolet rays were irradiated at 200 mJ/cm$^2$ under a condition in an oxygen concentration of 0.1% to cure the coated layer, thereby providing a middle refractive index layer (refractive index: 1.62, thickness: 60 nm). Subsequently, the foregoing coating composition A for optical functional layer was coated on the middle refractive index layer using a slot die coater (the coater as shown in FIG. 3(A) of JP-A-2007-293313) and dried at 100° C. for one minute. Thereafter, purge with nitrogen was carried out, and ultraviolet rays were irradiated at 500 mJ/cm$^2$ under a condition in an oxygen concentration of 0.05% to cure the coated layer, thereby simultaneously forming a high refractive index layer and a low refractive index layer. There was thus prepared an optical film 1-1A. As a result of observation of a slice of the formed film by TEM, a state in which the hollow silica fine particle was arranged in a line on the surface, and a zirconia fine particle was maldistributed in a lower part could be confirmed. A thickness of each of the low refractive index layer and the high refractive index layer of the obtained optical functional layer was measured from the foregoing TEM image of the cross section. As a result the high refractive index layer and the low refractive index layer had a thickness of 110 nm and 95 nm, respectively.

(Preparation of Optical Films 1-1B to 1-1F)

Optical films 1-1B to 1-1F were each prepared in the same manner as in the optical film 1-1A, except for using the coating solutions B to F for optical functional layer, respectively as the coating solution for optical functional layer. A slice of each of the formed films was observed by TEM. As a result in 1-1B, 1-1D, 1-1E and 1-1F a state in which a zirconia fine particle was maldistributed in a lower part could be confirmed. Furthermore, in 1-1B, 1-1D and 1-1E a state in which the hollow silica fine particle was arranged in a line on the surface could also be confirmed. On the other hand, in 1-1C, in addition to the hollow silica fine particle arranged in a line on the surface, it was observed that the hollow silica fine particle also cohered in the zirconia fine particle maldistributed in a lower part.

(Preparation of Optical Films 1-1G to 1-1J)

Optical films 1-1C to 1-1J were each prepared in the same manner as in the optical film 1-1A, except for using the coating solutions C to J for optical functional layer, respectively as the coating solution for optical functional layer A slice of each of the formed films was observed by TEM. As a result, in 1-1H, though the high refractive index layer was formed, the hollow silica fine particle was uniformly distributed within the low refractive index layer and was not arranged in a line on the surface. Also, in 1-1J, the zirconia fine particle and the hollow silica fine particle were mixed in the optical functional layer.

(Preparation of Optical Film 1-1M)

An optical film 1-1M was prepared in the same manner as in the optical form 1-1A, except for using the coating solution B for middle refractive index as the coating solution for middle refractive index. A slice of the formed film was observed by TEM. As a result, even in 1-1M, the hollow silica Sine particle was arranged in a line on the surface, and the zirconia fine particle was maldistributed in a lower part. Also, in 1-1M, the attachment of contaminations or dusts was explicitly small as compared with 1-1A.

(Preparation of Optical Film 1-1KL)

Optical film 1-1KL was prepared in the same manner as in the optical film 1-1D, except for using the coating solution K for optical functional layer and the coating solution L for optical functional layer in place of the coating solution D for optical functional layer as the coating solution for optical functional layer and using the center disclosed in FIG. 6(A) of JP-A-2007-293313 to send the coating solution L from a slot die and send the coating solution K from a slide-type coating head. A slice of the formed film was observed by TEM. As a results even in 1-1KL, the hollow silica fine particle was arranged in a line on the surface, and the zirconia fine particle was maldistributed in a lower part. Compared with 1-1D, the arrangement of the silica fine particle and the interface planarity of the zirconia fine particle layer in the opposite side to the support became more even. Furthermore, approximately equivalent properties to 1-1D were shown in integrated reflectance and scratch resistance by steel wool.

(Calculation of Surface Free Energy)

A mixture of a perfluoroolefin copolymer (P1) and reactive silicone X-22-164B a heat crosslinking fluorine-containing polymer (JTA113, solids concentration: 6%, manufactured by JSR Corporation) and a mixture of dipentaerythritol pentaacrylate and dipentaerythritol hexaacrylate (DPHA, manufactured by Nippon Kayaku Co., Ltd.) were each dissolved in MEK; and each of the solutions was coated, dried and cured to prepare a cured material, surface free energy of which was then determined alone. As to the perfluoroolefin copolymer (P1) and the mixture of dipentaerythritol pentaacrylate and dipentaerythritol hexaacrylate (DPHA, manufactured by Nippon Kayaku CO$_1$ Ltd.), a photopolymerization initiator having a solids concentration of 5% (IRGACURE 907 (trade name), manufactured by Ciba Japan K.K.) was added. The drying and curing condition was the same as that at the time of curing the optical functional layer of the optical film 1-1A, The surface free energy was calculated from a contact angle against water and methylene iodide.

The mixture of a perfluoroolefin copolymer (P1) and reactive silicone X-22-164B and the mixture of dipentaerythritol pentaacrylate and dipentaerythritol hexaacrylate (DPHA, manufactured by Nippon Kayaku Co., Ltd.) had surface free energy of 22.5 mN/m and 49.0 mN/m, respectively.

As to the silica dispersion A and dispersion B, the particle was sedimented by means of centrifugation; after decantation, an MEK solvent was added; and ultrasonic waves were applied for 2 minutes from an ultrasonic generator. Thereafter; the centrifugation, the decantation the addition of an MEK solvent and the ultrasonic waves application were repeated 4 times; and thereafter, the resulting mixture was cast on a glass substrate and dried, thereby obtaining a thin film sample of oxide fine particle. The surface free energy was calculated by means of measurement of a contact angle of the sample. As a result, the thin film of oxide fine particle prewound around a tip part (1 cm×1 cm) of the tester coming into contact with a sample and fixed by a band.
Movement distance (one way): 13 cm
Rubbing rate: 13 cm/sec
Load: 200 g/cm$^2$
Contact area of tip pail: 1 cm×1 cm
Number of rubbing: 10 reciprocations An oily black ink was applied on the back side of the rubbed sample, a scratch of the rubbed portion was visually observed by reflected light, and determination was carried out according to the following criteria.
A: The scratch is not substantially observed.
B: The scratch is not substantially noticeable.
C: The scratch is noticeable.

TABLE 1

| Sample Name | Content of hollow silica in solid | Content of zirconia in solid | Remark | $P_{Lo}/P_{Lt}$ | $P_{Hd}/P_{Hl}$ | Integrated reflectance | Scratch resistance by steel wool | Surface maldistribution properties of silica fine particle | |
|---|---|---|---|---|---|---|---|---|---|
| 1-1A | 13% | 38% | Appropriate amount of silica | 316% | 186% | 0.30% | A | Arranged in a line on the surface | Invention |
| 1-1B | 15% | 38% | Appropriate amount of silica | 288% | 186% | 0.41% | A | Arranged in a line on the surface | Invention |
| 1-1C | 22% | 38% | Large amount of silica | 196% | 186% | 1.4% | A | Arranged in a line on the surface and existed in a lower part | Comparison |
| 1-1D | 5% | 38% | Appropriate amount of silica | 320% | 186% | 0.52% | A | Arranged in a line on the surface | Invention |
| 1-1E | 2% | 38% | Small amount of silica | 325% | 186% | 0.80% | B | Arranged in a line on the surface | Invention |
| 1-1F | 0% | 38% | No silica | — | 186% | 1.2% | C | (Zirconia particle maldistributed in a lower part) | Comparison |
| 1-1G | 13% | 38% | Non-surface modified silica | 5% | 151% | 4.8% | C | Mixed with zirconia particle and also existed in a lower part | Comparison |
| 1-1H | 13% | 38% | Fluorine based surface modification | 217% | 186% | 0.35% | C | Uniformly distributed in low refractive index layer | Comparison |
| 1-1I | 13% | 0% | No zirconia | 316% | — | 3.0% | B | Mixed with zirconia particle and also existed in a lower part | Comparison |
| 1-1J | 13% | 38% | No fluorine-containing compound | 100% | 100% | 2.7% | A | Uniformly distributed together with silica-zirconia particle in optical functional layer | Comparison | pared from each of the silica dispersion A and dispersion B had surface free energy of 35.8 mN/m and 27.0 mN/m, respectively.
(Evaluation of Optical Film)
The obtained optical films were evaluated with respect to the following items. The results obtained are summarized in Table 1.
(1) Integrated Reflectance:
The back surface of the optical film (a surface not having an optical functional layer) was roughed by sand paper and then treated with a black ink, thereby making the back surface free from reflection. In this state, an integrated reflectance was measured by a spectrophotometer V-530 (manufactured by JASCO Corporation), and an average reflectance at from 450 to 650 nm was calculated, thereby evaluating antireflection properties.
(2) Evaluation of Scratch Resistance by Steel Wool:
By carrying out a rubbing test under the following condition using a rubbing tester, it is possible to provide an index for scratch resistance.
Evaluation circumstance condition, 25° C., 60% RH
Rubbing material: Steel wool (manufactured by Nippon Steel Wool Co., Ltd., Grade No. 0000) The steel wool is All of optical films 1-1A, 1-1B and 1-1D had an integrated reflectance of not more than 1.0% and exhibited satisfactory antireflection properties. In particular, 1-1A exhibited the most excellent antireflection properties as 0.30%. Also, all of them exhibited satisfactory scratch resistance. Furthermore, both of 1-1M and 1-KL had an integrated reflectance of 0.03% and exhibited excellent antireflection properties equal to those in 1-1A. Also, 1-1M and 1-KL were excellent in the scratch resistance.

On the other hand, though the optical film 1-1E exhibited satisfactory antireflection properties, too, it was inferior in the scratch resistance to 1-1A. Though the optical film 1-1C (comparative example) had satisfactory scratch resistance, it was not sufficient in the antireflection properties; and the optical film 1-1F (comparative example) had a high reflectance and was not excellent in the scratch resistance. 1-1G (comparative example) had a higher reflectance. Though 1-1H (comparative example) was satisfactory in the reflectance, it was not excellent in the scratch resistance; and all of 1-1I (comparative example) and 1-1J (comparative example) exhibited a high reflectance.

A TEM photograph of a slice of each of 1-1A to 1-1I, 1-1M and 1-1KL was taken, thereby confirming the existing state of the hollow silica fine particle and the zirconia fine particle. In 1-1A to 1-1C, 1-1M and 1-1KL, a state in which the zirconia fine particle was maldistributed in a lower part, the hollow silica fine particle was densely arranged in parallel in one layer substantially closely on the surface, and a portion wherein the hollow silica fine particle existed, a portion where no fine particle existed and a portion where the zirconia fine particle existed were distinctly separated from each other was confirmed. In particular, in 1-1B and 1-1C, several hollow silica fine particles superimposed and existed on the surface; and furthermore, in 1-1C, not only the hollow silica fine particle was arranged in parallel on the surface, but it was mixed with the zirconia fine particle and existed in a lower part. Also, in 1-1D and 1-1E, though the hollow silica fine particle was arranged in parallel on the surface, it was sparsely distributed, and a site where no fine particle existed on the outermost surface was found. In 1-1G, the hallow silica fine particle was mixed with the zirconia fine particle and existed only in a lower pal, and a fine particle to be maldistributed on the surface was not observed. In 1-1H, a state in which the zirconia fine particle was maldistributed in a lower part, and the hollow silica fine particle was uniformly distributed in the low refractive index layer was found. In 1-1J, it was confirmed that the hollow silica fine particle and the zirconia fine particle were mixed and uniformly distributed over the whole of the optical functional layer.

(Preparation of Optical Film 1-1N)

An optical film 1-1N was prepared in the same manner as in 1-1A, except that by using a die coater for simultaneous multilayer coating (the coater as shown in FIG. 6(A) of JP-A-2007-293313), the coating solution A for hard coat layer and the coating solution A for middle refractive index were simultaneously extruded from a slot part and a slide part, respectively onto the transparent support by a slot die. As to the drying and curing condition of each of the hard coat layer and the middle refractive index layer having been subjected to simultaneous multilayer coating, drying was carried out at 100° C. for 2 minutes; and subsequently, ultraviolet rays were irradiated while purging with nitrogen at 200 mJ/cm$^2$ under a condition in an oxygen concentration of 0.1%. Though the obtained optical film 1-1N had an integrated reflectance of 0.4%, a value of which was slightly inferior to that of 1-1A, an optical film having a satisfactory antireflection performance could be efficiently prepared. Also, since it was noted that by obtaining such antireflection ability, an antireflection structure was formed, it could be confirmed that the low refractive index layer, the high refractive index layer and the middle refractive index layer were optically separated into a layer, respectively. Furthermore, a TEM photograph of a slice was taken, thereby confirming the existing state of the hollow silica fine particle and the zirconia fine particle. As a result, it was found that the zirconia fine particle was maldistributed in a lower part, thereby forming a uniform layer and that the hollow silica fine particle was maldistributed on the outermost surface. Also, the scratch resistance was excellent similar to that of the optical film 1-1A.

(Preparation of Optical Film 1-1O)

An optical film 1-1O was prepared in the same manner as in 1-1A, except that by using a die coater having one more slide part than a die coater for simultaneous multilayer coating (the coater as shown in FIG. 6(A) of JP-A-2007-293313), the coating solution for hard coat layer was extruded from a slot part, and the coating solution A for middle refractive index and the coating solution A for optical functional layer were extruded from two slide parts, respectively and simultaneously coated onto the transparent support by a slot die. As to the drying and curing condition of each of the hard coat layer and the middle refractive index layer having, been subjected to simultaneous multilayer coating, drying was carried out at 100° C. for 2 minutes; and subsequently, ultraviolet rays were irradiated while purging with nitrogen at 500 mJ/cm$^2$ under a condition in an oxygen concentration of 0.05%. Though the obtained optical film 1-1O had an integrated reflectance of 0.5%, a value of which was slightly inferior to that of 1-1A, an optical film exhibiting a satisfactory antireflection performance could be efficiently prepared. Also, since it was noted that by obtaining such antireflection ability, an antireflection structure was formed, it could be confirmed that the low refractive index layer, the high refractive index layer and the middle refractive index layer were optically separated into a layer, respectively, Furthermore, a TEM photograph of a slice was taken, thereby confirming the existing state of the hollow silica fine particle and the zirconia fine particle. As a result, it was found that the zirconia fine particle was maldistributed in a lower part and that the hollow silica fine particle was maldistributed on the outermost surface. The scratch resistance of 1-1O was excellent similar to that of the optical film 1-1A.

(Saponification Treatment of Optical Film)

Each of the foregoing optical films 1-1A, 1-1B and 1-1D was subjected to the following treatment. That is, a 1.5 moles/L sodium hydroxide aqueous solution was prepared and kept at 55° C. A 0.01 mmoles/L dilute sulfuric acid aqueous solution was prepared and kept at 35° C. The prepared optical film was dipped in the foregoing sodium hydroxide aqueous solution for 2 hours and then dipped in water, thereby thoroughly washing away the sodium hydroxide aqueous solution. Subsequently, the resulting sample was dipped in the foregoing dilute sulfuric acid aqueous solution for one minute and then dipped in water, thereby thoroughly washing away the dilute sulfuric acid aqueous solution. Finally, the sample was thoroughly dried at 120° C.

There was thus prepared a saponified optical film.

(Preparation of Polarizing Plate)

A triacetyl cellulose film having a thickness of 80 μm (TAC-TA80U, manufactured by FUJIFILM Corporation) which had been dipped in a 1.5 moles/L NaOH aqueous solution at 55° C. for 2 minutes, neutralized and then washed with water and the saponified optical film (each of the saponified samples 1-1A, 1-1B and 1-1D) were adhered for protection onto the both surfaces of a polarizer prepared by adsorbing iodine onto polyvinyl alcohol and stretching, thereby preparing a polarizing plate. The thus prepared polarizing plate samples are designated as polarizing plate samples 1-2A, 1-2B and 1-2D.

Also, a polarizing plate was prepared using the foregoing saponified triacetyl cellulose film as a protective film on the both surfaces. The thus prepared polarizing plate is designated as a sample 1-2M (comparison).

(Evaluation of Polarizing Plate)

Each of the prepared polarizing plate samples 1-2A, 1-2B, 1-2D and 1-2M was stuck in place of a polarizing plate on the viewing side of a liquid crystal television set ("LC-37GD4" (MVA mode), manufactured by Sharp Corporation).

In the case of using each of the polarizing plate samples of the examples of the invention 1-2A, 1-2B and 1-2D as a polarizing plate, an image which is less in reflection and good in contrast was obtained. Also, an image which is free from color tinting by reflection on the surface and in which a black color is viewed black was obtained. In the case of using the comparative sample 1-2M, antireflection properties were not revealed, and a strong reflection image was reflected, thereby adversely affecting the display performance.

(Preparation of Circular Polarizing Plate)

A λ/4 plate was stuck onto the surface of the optical film 1-1A on the opposite side to the optical functional layer with an adhesive, thereby preparing a circular polarizing plate (sample 1-3A). The sample 1-3A was stock onto the surface of an organic EL display with an adhesive such that the optical functional layer was located outside. As a result, a satisfactory display performance which is less in reflection was obtained.

The sample 1-3A was used as a polarizing plate on the surface of each of a reflection type liquid crystal display and a semi-transmission type liquid crystal display such that the low refractive index layer was located outside. As a result, a satisfactory display performance which is less in reflection was obtained.

Example 2

(Preparation of Optical Film)
(Preparation of Optical Films 2-4A, 2-1B and 2-1D)

Optical films 2-1A, 2-1B and 2-1D were each prepared in the same manner as in the optical film 1-1A, except for using the coating solution B for hard coat layer as the coating solution for hard coat layer and using the coating solutions A, B and D for optical functional layer, respectively as the coating solution for optical functional layer.

In 2-1A, 2-1B and 2-1D each using the coating solution B for hard coat layer to which E crosslinked poly(acryl-styrene) particle having an average particle size of 3.5 µm had been added, satisfactory antireflection properties and scratch resistance were found, and the antireflection properties were more improved than those in 1-1A, 1-1B and 1-1D due to the antiglare function. In particular, the integrated reflection of 2-1A was low as 0.30% so that excellent antireflection properties were exhibited together with the antiglare properties.

(Saponification Treatment of Optical Film and Preparation of Polarizing Plate)

A saponification treatment and polarizing plate preparation were carried out in the same manners as in 1-1A, 1-1B and 1-1D, except for using each of 2-1A, 2-1B and 2-1D as the optical film samples, thereby preparing polarizing plate samples 2-2A, 2-2B and 2-2D.

(Evaluation of Polarizing Plate)

in the case of using each of the polarizing plate samples of the examples of the invention 2-2A, 2-2B and 2-2D as a polarizing plate, an image which is more improved in reflection due to antiglare properties and good in contrast was obtained. Also, an image which is free from color tinting by reflection on the surface and in which a black color is viewed black was obtained. In particular, 2-2A was substantially free from the reflection and exhibited the most excellent antireflection properties.

Example 3

(Preparation of Optical Film)
(Preparation of Optical Films 3-1A, 3-1B and 3-1D)

Optical films 3-1A, 3-1B and 3-1D were each prepared in the same manner as in the optical film 1-1A, except for not using the middle refractive index layer and using the coating solutions A, B and D for each of optical functional layers as the coating solutions for each of optical functional layers, respectively.

Even in the case of not providing the middle refractive index layer on the hard coat layer, in 3-1A, 3-1B and 3-1D, satisfactory antireflection properties and scratch resistance were found. 3-1A had a low reflection as 0.50% and exhibited excellent antireflection properties even in a two-layer type optical film, (Saponification Treatment of Optical Film and Preparation of Polarizing Plate)

A saponification treatment and polarizing plate preparation were carried out in the same manners as in 1-2A, except for using each of 3-1A, 3-1B and 3-1D as the optical film sample, thereby preparing polarizing plate samples 3-2A, 3-2B and 3-2D.

(Evaluation of Polarizing Plate)

In the Case of Using Each of the Polarizing Plate Samples of the Examples of the invention 3-2A, 3-2B and 3-2D as a polarizing plate, an image which is less in reflection of external light, less in reflection and good in contrast was obtained.

The optical film of the invention is low in reflectance and excellent in scratch resistance. Also, the method for producing an optical film of the invention is suitable for mass production. Furthermore, the image display device provided with the polarizing plate using the optical film of the invention is less in reflection of external light or reflection of background, high in visibility and excellent in scratch resistance.

The entire disclosure of each and every foreign patent application front which the benefit of foreign priority has been claimed in the present application is incorporated herein by reference, as if fully set forth.

What is claimed is:

1. A method for producing an optical film that includes a transparent support and an optical functional layer as the outermost layer of the optical film, the method comprising:
   applying a curable composition directly or indirectly on the transparent support, the curable composition containing low refractive index fine particles having a refractive index of not more than 1.45, high refractive index fine particles having a refractive index of 1.55 or more, and a fluorine-containing compound: and
   curing the curable composition to form the optical functional layer having a thickness of 50 nm or more and not more than 250 nm,
   wherein in the optical functional layer, the low refractive index fine particles are arranged substantially in a line on the outermost surface of the optical functional layer on the opposite side of the transparent support; and
   the high refractive index fine particles are unevenly distributed in a lower pan of the optical functional layer on the side of the transparent support.

2. The method according to claim 1, wherein the low refractive index fine particles are silica fine particles or hollow silica fine particles.

3. The method according to claim 1, wherein the low refractive index fine particles are surface-modified with a fluorine atom-free silarie coupling agent.

4. The method according to claim 1, wherein the optical functional layer contains the low refractive index fine particles in a range of from 5% by mass to 15% by mass with respect to the entire solid content of the optical functional layer.

5. The method according to claim 1, wherein the optical functional layer contains the high refractive index fine particles in a range of from 30% by mass to 50% by mass with respect to the entire solid content of the optical functional layer.

* * * * *